(12) United States Patent
Merrill et al.

(10) Patent No.: US 11,382,315 B2
(45) Date of Patent: Jul. 12, 2022

(54) SYSTEMS AND METHODS FOR THE CULTIVATION OF TARGET PRODUCT

(71) Applicant: Running Tide Technologies, Inc., Portland, ME (US)

(72) Inventors: Nathaniel Merrill, Portland, ME (US); Max Chalfin, New York, NY (US); Andrew Clyde Thompson, Biddeford, ME (US); Margaux Martin-Filippi, Lone Tree, CO (US); Finnian Cradock Donovan, North Yarmouth, ME (US); Matthew Jordan Odlin, Freeport, ME (US)

(73) Assignee: Running Tide Technologies, Inc., Portland, ME (US)

( * ) Notice: Subject to any disclaimer, the term of this patent is extended or adjusted under 35 U.S.C. 154(b) by 0 days.

(21) Appl. No.: 17/342,143

(22) Filed: Jun. 8, 2021

(65) Prior Publication Data

US 2021/0345589 A1 Nov. 11, 2021

Related U.S. Application Data

(63) Continuation of application No. PCT/US2021/031833, filed on May 11, 2021.

(Continued)

(51) Int. Cl.
| | | |
|---|---|---|
| A01K 63/04 | (2006.01) | |
| A01K 61/50 | (2017.01) | |
| A01K 61/10 | (2017.01) | |

(52) U.S. Cl.
CPC ............. *A01K 63/04* (2013.01); *A01K 61/10* (2017.01); *A01K 61/50* (2017.01)

(58) Field of Classification Search
CPC ........ A01K 61/60; A01K 61/70; A01K 61/75; A01K 61/78
See application file for complete search history.

(56) References Cited

U.S. PATENT DOCUMENTS

| 4,051,810 A | 10/1977 | Breit |
|---|---|---|
| 4,133,141 A | 1/1979 | Lee |

(Continued)

FOREIGN PATENT DOCUMENTS

| CN | 1208552 A | 2/1999 |
|---|---|---|
| CN | 204168860 U | 2/2015 |

(Continued)

OTHER PUBLICATIONS

Uykun, Cuma, "Above Ground Biomass and Carbon Estimations and Recommendations for Forests in Turkey", 2018, Michigan Technological University, Open Access Master's Thesis, p. 12 (Year: 2018).*

(Continued)

*Primary Examiner* — Tien Q Dinh
*Assistant Examiner* — Katelyn T Truong
(74) *Attorney, Agent, or Firm* — Cooley LLP

(57) ABSTRACT

Systems and methods for cultivating or accumulating climate-focused marine target products are described herein. The target product may be microalgae, macroalgae, plankton, marine bacteria or archaea, filter feeders (such as oysters or clams), or crustaceans either for the purpose of bioremediation, eventual cultivation or for sequestering carbon dioxide; or the target product may be direct chemical or biological accumulation of carbon or carbon containing organisms. The system is primarily a floating apparatus designed to hold the target product in a region of the water column and in a spatial region of the water where it will best accumulate target product mass. In some embodiments the (Continued)

system is designed to achieve eventual passive sinking (transformation from a floating to sinking apparatus) into the deep ocean. In some embodiments, the system is equipped with purpose-chosen sensors to instrument and quantify the various biological and mechanical processes occurring onboard.

30 Claims, 13 Drawing Sheets

Related U.S. Application Data

(60) Provisional application No. 63/078,690, filed on Sep. 15, 2020, provisional application No. 63/022,765, filed on May 11, 2020.

(56) References Cited

U.S. PATENT DOCUMENTS

| | | | |
|---|---|---|---|
| 4,235,043 | A | 11/1980 | Harasawa et al. |
| 4,395,970 | A | 8/1983 | Kunkle et al. |
| 5,309,672 | A | 5/1994 | Spencer et al. |
| 5,846,423 | A | 12/1998 | Jensen |
| 6,062,170 | A | 5/2000 | Finch et al. |
| 6,230,646 | B1 | 5/2001 | Berry et al. |
| 6,244,218 | B1 | 6/2001 | McNeil |
| 6,343,567 | B1 | 2/2002 | McNeil et al. |
| 6,539,894 | B1 | 4/2003 | Byrne et al. |
| 6,892,672 | B2 | 5/2005 | Klein |
| 7,836,633 | B2 | 11/2010 | Wilcox |
| 7,905,055 | B2 | 3/2011 | Wilcox |
| 2002/0162515 | A1 | 11/2002 | Boyd |
| 2006/0162667 | A1 | 7/2006 | Papadoyianis et al. |
| 2007/0209278 | A1* | 9/2007 | Becker .................. A01G 31/00 47/59 R |
| 2009/0151240 | A1 | 6/2009 | Kayama et al. |
| 2009/0210295 | A1* | 8/2009 | Edholm ................. G06Q 50/02 705/7.39 |
| 2010/0154298 | A1* | 6/2010 | Albus ..................... C12P 7/649 47/1.4 |
| 2011/0289840 | A1 | 12/2011 | Bakken |
| 2012/0011050 | A1 | 1/2012 | Lambert |
| 2015/0020445 | A1 | 1/2015 | Grajcar |
| 2018/0116139 | A1 | 5/2018 | Karta |
| 2018/0170486 | A1* | 6/2018 | Sinclair ................. A01K 61/54 |
| 2019/0141925 | A1* | 5/2019 | Le Berre ................ A01G 15/00 47/1.4 |
| 2019/0377946 | A1* | 12/2019 | Genty ................ G06K 9/00664 |
| 2020/0338497 | A1* | 10/2020 | McDaniel .......... B65D 23/0814 |
| 2021/0112786 | A1* | 4/2021 | Fries ...................... A01K 61/78 |
| 2021/0267214 | A1* | 9/2021 | Farmer .................. A01N 61/00 |

FOREIGN PATENT DOCUMENTS

| | | |
|---|---|---|
| CN | 204350804 U | 5/2015 |
| CN | 104082120 B | 1/2016 |
| JP | H0965795 A | 3/1997 |
| JP | 2002119161 A | 4/2002 |
| JP | 2005348696 A | 12/2005 |
| JP | 2006288207 A | 10/2006 |
| JP | 2008061509 A | 3/2008 |
| JP | 2008148575 A | 7/2008 |
| RU | 126327 U1 * | 3/2013 |
| WO | WO-2006030042 A1 | 3/2006 |
| WO | WO-2014138982 A1 | 9/2014 |
| WO | WO-2018115339 A1 | 6/2018 |
| WO | WO-2019140462 A1 | 7/2019 |

OTHER PUBLICATIONS

Stanford Environmental Health and Safety, Information on Alkali Metals, Acquired 2022 (Year: 2022).*
International Search Report and Written Opinion for International Application No. PCT/US2021/031833, dated Aug. 11, 2021, 13 pages.
Mooney-McAuley, K. M. et al., "Best Practice Guidelines for Seaweed Cultivation and Analysis," Report WP1A5.01, Energetic Algae ("EnAlgae"), Jun. 2016, 38 pages.
Peeples, T., "An inside look into blue evolution's seaweed hatchery," [Online], Blue Evolution, 2019, 5 pages, Retrieved from the Internet: URL: https://www.blueevolution.com/recipesblog/inside-look-seaweed-hatchery.
Redmond, S. et al., "Aquaculture in Shared Waters Kelp Aquaculture," Island Institute, Apr. 2015, 4 pages.
Walker, T., "Kelp farming in Alaska traces roots to hatcheries," [Online], Hatchery International, Oct. 2019, 5 pages, Retrieved from the Internet: URL: https://www.hatcheryinternational.com/kelp-farming-success-in-alaska-traces-roots-to-hatcheries/.
International Search Report and Written Opinion for International Application No. PCT/US2021/054952, dated Jan. 19, 2022, 13 pages.

* cited by examiner

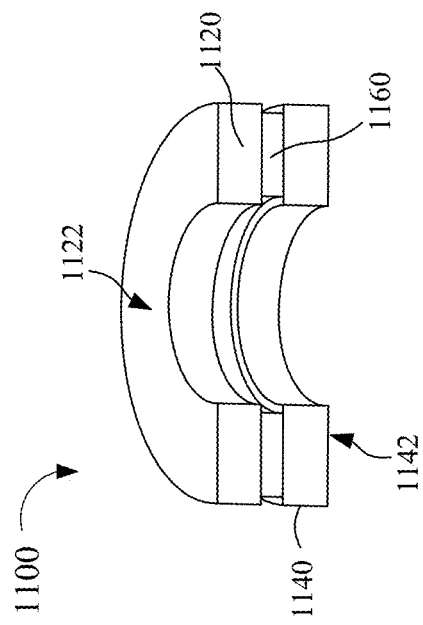
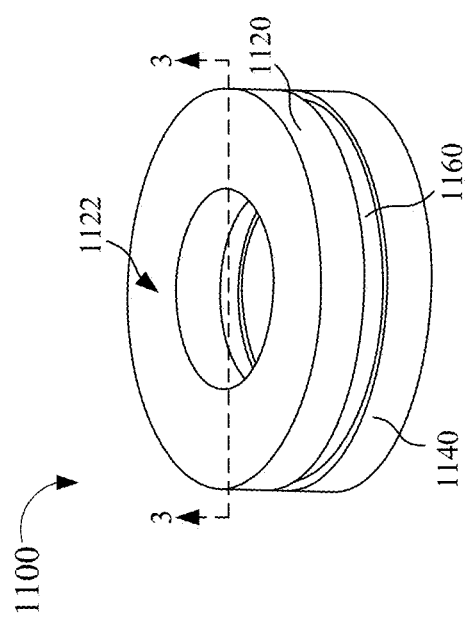
FIG. 11A
FIG. 11B

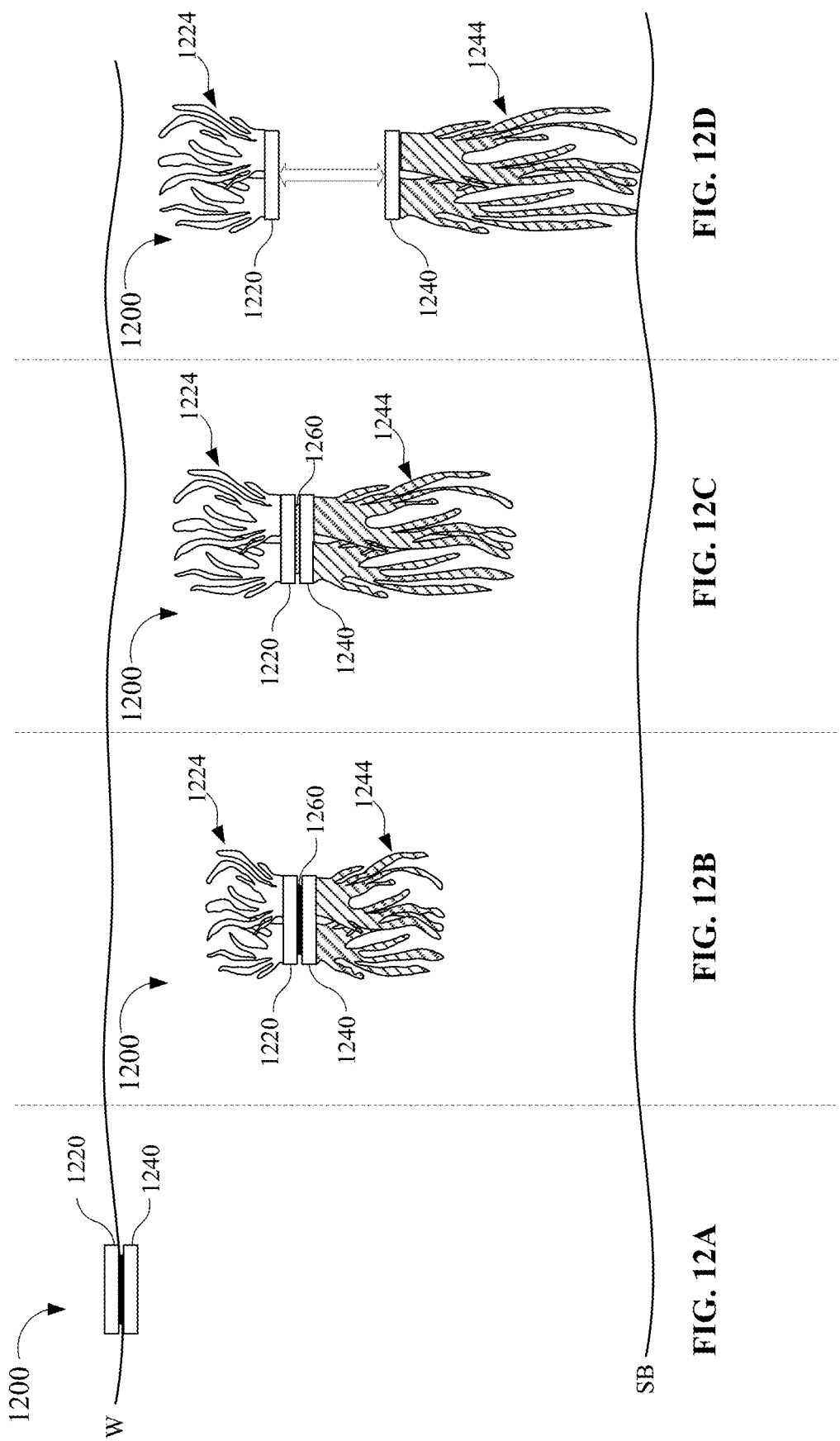

1400

```
┌─────────────────────────────────────────────────────────────┐
│   Seed an apparatus with one or more species of macroalgae  │
│                          1401                                │
└─────────────────────────────────────────────────────────────┘
                              │
                              ▼
┌─────────────────────────────────────────────────────────────┐
│              Deploy the apparatus in a body of water         │
│                          1402                                │
└─────────────────────────────────────────────────────────────┘
                              │
                              ▼
┌─────────────────────────────────────────────────────────────┐
│  Allow the one or more species of macroalgae to grow and    │
│                    accumulate biomass                        │
│                          1403                                │
└─────────────────────────────────────────────────────────────┘
                              │
                              ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│  Determine an amount of carbon captured by the accumulation │
│                      of the biomass                          │
│                          1404                                │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                              │
                              ▼
┌─────────────────────────────────────────────────────────────┐
│           Allow the macroalgae to sink to the seafloor       │
│                          1405                                │
└─────────────────────────────────────────────────────────────┘
                              │
                              ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│  Sell a carbon credit associated to the amount of carbon    │
│                       sequestered                            │
│                          1406                                │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 14

SYSTEMS AND METHODS FOR THE CULTIVATION OF TARGET PRODUCT

CROSS-REFERENCE TO RELATED APPLICATIONS

This application is a continuation of International Patent Application No. PCT/US2021/031833, entitled "Systems and Methods for the Cultivation of Target Product," filed May 11, 2021, which claims the benefit of U.S. Provisional Patent Application Ser. No. 63/022,765, entitled "Systems and Methods for the Cultivation of Macroalgae," filed May 11, 2020, and U.S. Provisional Patent Application Ser. No. 63/078,690, entitled "Systems and Methods for the Cultivation of Macroalgae," filed Sep. 15, 2020, the disclosures of which are incorporated by reference herein in their entireties.

BACKGROUND

The cultivation of marine mass and the associated removal of so called "blue carbon" from the oceans, has gained significant interest in recent years. Microalgae, macroalgae, crustaceans, and filter feeders can be used for food or feed, as food processing additives, packaging materials, fertilizers, and as raw materials for biofuels, cosmetics, pharmaceutical products, bioremediation, carbon capture and toward other ends. Taken together, they are considered a promising resource for the future. Cultivating or accumulating this marine mass has many advantages. Compared to the cultivation of plants on land, the cultivation of these products leads to higher productivity. In addition, no scarce farmland or freshwater is needed and no additional nutrients are needed for ocean based cultivation. Furthermore, targeted cultivation of marine species can make an important contribution to protecting or increasing the marine biodiversity and/or to mitigating harmful effects of anthropogenic greenhouse gas emissions (e.g., carbon dioxide and/or the like). Some methods for cultivation, however, can be labor intensive, inefficient, and/or expensive. Accordingly, a need exists for improved systems and methods for cultivating or accumulating these marine species as well as well as for capturing carbon dioxide from the oceans.

SUMMARY

Systems and methods are described herein for cultivating or accumulating target products, which can encompass a wide variety of species including microalgae, macroalgae, plankton, marine bacteria, archaea filter feeders (such as oysters or clams), or crustaceans either for the purpose of bioremediation, eventual cultivation or for sequestering carbon dioxide; or for the direct chemical or biological accumulation of carbon or carbon containing organisms. The system is primarily a floating apparatus designed to hold the target product in a region of the water column and in a spatial region of the water where it will best accumulate target product mass.

In some embodiments, a method includes seeding an apparatus with a species of target product, allowing the target product to grow and accumulate mass, after the target product accumulates at least a predetermined amount of mass, allowing the target product to sink to the seafloor; and determining an amount of carbon sequestered by the sinking of the target product.

In some embodiments, the systems include an apparatus for cultivating or accumulating a target product having a first member configured to provide buoyancy to the apparatus, and a second member to cultivate or accumulate species target product and coupled to the first member, wherein the first member is configured to lose buoyancy after a predetermined time thereby allowing the target product to sink to the floor.

In some embodiments, the systems include an apparatus for cultivating or accumulating a target product having a first member configured to provide buoyancy to the apparatus, a second member to cultivate or accumulate species target product and coupled to the first member, and a release component configured to degrade after a predetermined time, thereby allowing the target product to sink to the seafloor.

In some embodiments, the systems include an apparatus for cultivating or accumulating target product having a first member configured to provide buoyancy to the apparatus for a period of time, and a second member to cultivate or accumulate species of target product and coupled to the first member, wherein the first member is configured to at least partially sink after the period of time in response to the growth and/or mass accumulation of the target product.

In some embodiments, the systems include an apparatus for cultivating or accumulating target product having a first member to cultivate or accumulate a first species of target product that becomes positively buoyant as it matures, a second member to cultivate or accumulate a second species of target product that becomes negatively buoyant as it matures, and an intermediate member configured to degrade and decouple the first member from the second member.

In some embodiments, a method includes: seeding an apparatus with a species of macroalgae, allowing the macroalgae to grow and accumulate biomass, allowing the macroalgae to sink to the seafloor after the macroalgae accumulates at least a predetermined amount of biomass, and determining an amount of carbon sequestered by the sinking of the macroalgae.

In some embodiments, the systems include an apparatus for cultivating macroalgae having a first member configured to provide buoyancy to the apparatus, and a second member seeded with a species of macroalgae and coupled to the first member, wherein the first member is configured to lose buoyancy after a predetermined time thereby allowing the macroalgae to sink to the floor.

In some embodiments, the systems include an apparatus for cultivating macroalgae having a first member configured to provide buoyancy to the apparatus, a second member seeded with a species of macroalgae and coupled to the first member, and a release component configured to degrade after a predetermined time, thereby allowing the macroalgae to sink to the seafloor.

In some embodiments, the systems include an apparatus for cultivating macroalgae having a first member configured to provide buoyancy to the apparatus for a period of time, and a second member seeded with a species of macroalgae and coupled to the first member, wherein the first member is configured to at least partially sink after the period of time in response to the growth and biomass accumulation of the macroalgae.

In some embodiments, the systems include an apparatus for cultivating macroalgae having a first member seeded with a first species of macroalgae that becomes positively buoyant as it matures, a second member seeded with a second species of macroalgae that becomes negatively buoyant as it matures, and an intermediate member configured to degrade and decouple the first member from the second member.

BRIEF DESCRIPTION OF THE DRAWINGS

FIGS. 11A and 11B are perspective views of a target product cultivation apparatus, according to an embodiment.

FIGS. 12A-12D are schematic illustrations of the life cycle of a target product, according to an embodiment.

FIG. 14 is a flow chart of an example method of operating a target product cultivation apparatus for sequestering an amount of carbon dioxide according to an embodiment.

DETAILED DESCRIPTION

Figure 1:
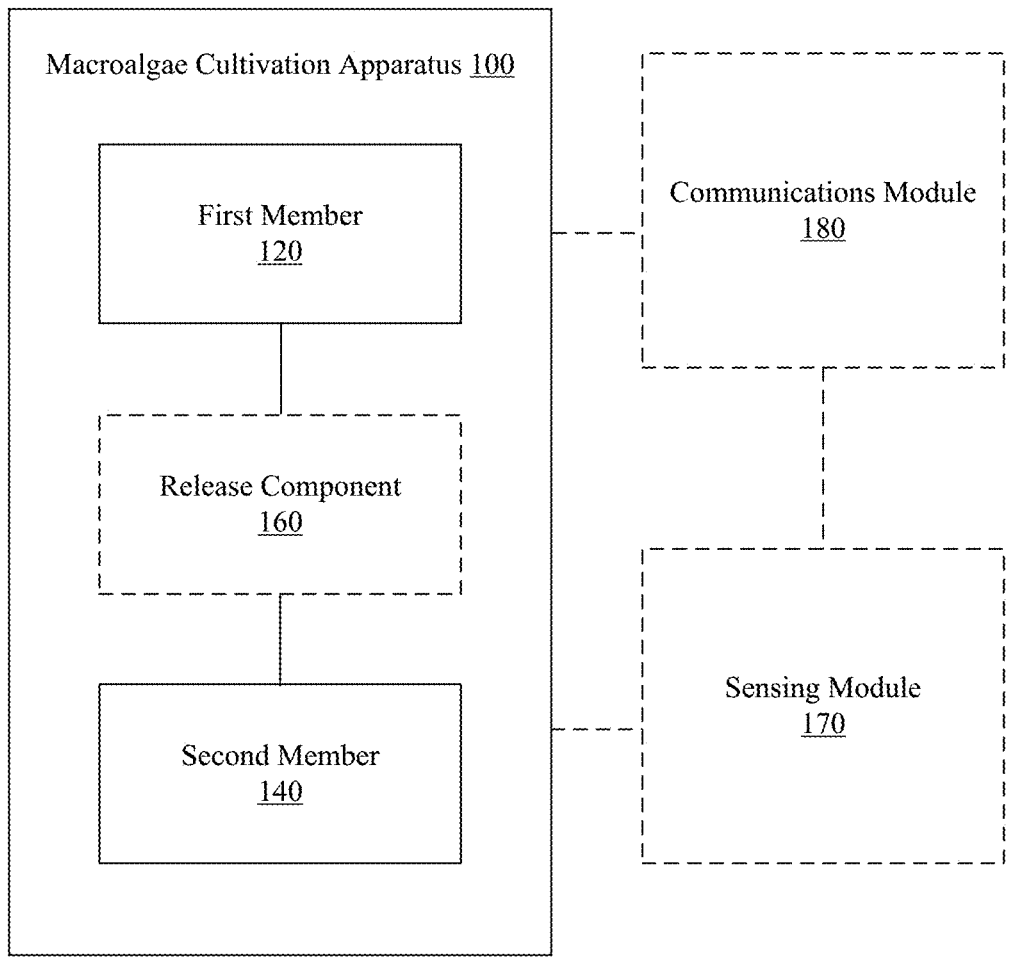
FIG. 1 is a schematic illustration of a target product cultivation apparatus, according to an embodiment.

The abatement of harmful anthropogenic greenhouse gas emissions requires the development of technologies for carbon sequestration at the multi-gigaton scale in order to be atmospherically significant. Many target products (e.g., macroalgae) show promise as a carbon sequestration pathway as their wild growth currently contributes to naturally occurring carbon sequestration to the seafloor. Target product cultivation has the potential to improve this sequestration rate significantly due to increased cultivation productivity and sinking/sequestration rate relative to these naturally occurring phenomena. Additionally, this technology may become increasingly desirable as prices in the global carbon credit market continue to climb. For example, in some implementations, an amount of carbon that can be sequestered per unit of target product can be calculated and sold in a carbon credit market (or any other suitable market) as a credit tied to and/or otherwise associated with the calculated capacity of a unit of target product to sequester that carbon.

Some known methods for growing and/or cultivating or accumulating target products use longlines, which need to be tended after placing and harvested after the growth period is completed, resulting in prohibitively high labor costs. As such, a need exists for target product cultivation systems and methods that do not require longlines, and thus little to no tending after placement, and that may be used solely for sequestration operations, for harvesting operations, and/or for both sequestration and harvesting, offering the potential to be a highly scalable solution from a manufacturing and operations standpoint for large scale carbon capture.

Systems and methods are described herein for cultivating or accumulating target products, encompass a wide variety of species including microalgae, macroalgae, plankton, marine bacteria, archaea filter feeders (such as oysters or clams), or crustaceans either for the purpose of bioremediation, eventual cultivation or for sequestering carbon dioxide; or for the direct chemical or biological accumulation of carbon or carbon containing organisms. The system is primarily a floating apparatus designed to hold the target product in a region of the water column and in a spatial region of the water where it will best accumulate target product mass.

Systems and methods for cultivating or accumulating target product are described herein. In some embodiments, the systems include an apparatus for cultivating or accumulating target product having a first member (also referred to as a "buoy") configured to provide buoyancy to the various components of the apparatus, a second member configured to cultivate or accumulate one or more species of target product, and optionally a release component configured to degrade and separate, disconnect, release and/or decouple the first member from the second member. In some embodiments, the apparatus can optionally include a sensing module and a communications module mechanically and/or electrically coupled to the apparatus. The sensing module can be configured to sense, detect, measure, and/or quantify one or more characteristics relevant to the growth of the target product disposed on the apparatus. The communications module can be configured to read the one or more characteristics relevant to the growth of the target product and to transmit signals representative of the target product growth characteristics to one or more external devices for analysis. In some embodiments, the communications module can receive from external devices one or more signals operable to control the release component and/or the sensing module.

In some embodiments, the system may float freely on ocean currents. In others, the system may be moored or tethered to an anchor or vessel. The system may be designed for eventual recapture or harvesting. The system may be instrumented with devices, electronics, or gauges designed to measure properties of the system's motion (such as location, depth, or acceleration), mechanical properties of the system (such as buoyancy or strain), or accumulation of the target product (such as through imaging, sonar, or proxy measurement). In such embodiments, the system may also be equipped with hardware and software for the purpose of telemetry.

In some embodiments the system may be designed to switch from positive to negative buoyancy, transforming from a floating apparatus to a sinking apparatus. This transformation may occur passively and after a tunable amount of time (such as by introduction of a specific defect, evolving chemical process, or the like). In sinking, the system may be designed to achieve the discrete, rapid, or quantifiable motion of carbon through the water column, and particularly through the ocean's thermocline. In some embodiments, the system may be designed to reside permanently at depth. In others, it may be designed to sink to such depths and subsequently resurface (such as through the mechanism of pressure release flotation, and/or for the purpose of observing maximal depth achieved at sinking and the evolution of the system at depth).

In some embodiments, a method includes: designing an apparatus to "cultivate" a target product. The apparatus may be seeded with gametophytes or spores of species of target product (e.g., macroalgae), allowing the target product to then grow and accumulate mass. The apparatus may be additionally enhanced with a nutrient payload designed for uptake by the target product. Such nutrient payload may be already active or water activated (such as the inclusion of steel elements that will oxidize and release iron oxide into the water around the apparatus). The apparatus may be additionally enhanced with cospecies to the target product, including one or more microbial cospecies and including those which metabolically fix nitrogen, whose presence is intended to improve the health, function, or mass accumulation of the target species.

In some embodiments, a method includes: designing an apparatus to "accumulate" a target product from ambient water around it. The target product may be organic (such as micro algae, phytoplankton, or bacteria) attracted to the apparatus as through biochemical means (such as with specifically chosen lights and or pheromones). The target product may be chemical species of dissolved organic carbon or dissolved inorganic carbon, accumulating on the apparatus through physical or chemical means (such as via pH gradients, marine weathering, or electrochemistry).

In some embodiments, a method includes: designing an apparatus to cultivate or accumulate species of target product, allowing the target product to grow and/or accumulate mass, allowing the target product to sink to the seafloor after the target product accumulates at least a predetermined amount of mass or after a predetermined amount of time, and determining an amount of carbon sequestered by the sinking of the target product.

In some embodiments, the systems include an apparatus for cultivating or accumulating a target product consisting of only one member which serves one or more functions (cultivation, accumulation, flotation, sinking) throughout the lifetime of the apparatus (for example the direct seeding of target product onto the flotation). In other embodiments, the system may include multiple members whose functions may be specialized and whose mechanical relationships with respect to one another may be designed to change throughout the lifetime of the apparatus.

In some embodiments, the systems include a member designed to provide negatively buoyancy to an otherwise neutral or positively buoyant system. These members may be solid weights (such as metallic or ceramic components), or components that dynamically accumulate mass from seawater (such as a sacrificial anode).

In some embodiments, the systems include a member designed to passively lose buoyancy after a predetermined period of time. This loss of buoyancy may occur via a transient "plug" without which the member would fill with water and sink. The lifetime of the plug may be calibrated with mechanical or electronic specifications, and may be achieved through galvanic corrosion, biodegradation, degradation in ultraviolet light, or the plug may be collapsible or rigged to release with a mechanical or electric timer.

In some embodiments in which apparatus includes a payload of nutrient or fertilizer, such payload may be designed to release slowly or intermittently using biodegradable or mechanical stages which prolong the period of release.

In some embodiments in which the apparatus may be found in the habitat of other marine life, the system may include members whose functions is to mitigate the interaction with other fauna. For example, the system may include colored bands to alert whales and other species to the presence of the apparatus so as to avoid entangling or otherwise disturbing these ecosystem members.

The systems and methods described herein can be used in oceans, lakes, rivers, and/or any other suitable body of water. In some embodiments, the systems include at least one apparatus configured to accumulate or cultivate species of target product, which become positively or negatively buoyant as they mature, and that can be harvested and/or sequestered.

Referring now to the drawings, FIG. 1 is a schematic illustration of a target product cultivation apparatus 100 according to an embodiment. The target product, as described herein, includes and/or encompasses a wide variety of species including microalgae, macroalgae, plankton, marine bacteria, archaea filter feeders (such as oysters or clams), or crustaceans either for the purpose of bioremediation, eventual cultivation or for sequestering carbon dioxide. The target product cultivation apparatus 100 (also referred to herein as "cultivation apparatus" or "apparatus") includes a first member 120 (also referred to as a "buoy") configured to provide buoyancy to the various components of the apparatus 100, a second member 140 configured to cultivate or accumulate one or more species of target product, and optionally, a release component 160 (also referred to herein as "intermediate member") configured to separate, disconnect, release and/or decouple the first member 120 from the second member 140. In some embodiments, the cultivation apparatus 100 can optionally be coupled to, or associated with, a sensing module 170 and a communications module 180. The sensing module 170 can be mechanically coupled to the cultivation apparatus 100 and configured to sense, detect, measure, and/or quantify one or more characteristics and/or images relevant to the species of target product disposed on the cultivation apparatus 100. The communications module 180 can be electrically and/or mechanically coupled to the sensing module 170 and/or to the cultivation apparatus 100, and can be configured to (1) read the one or more characteristics and/or images relevant to the target product, (2) transmit signals representative of said target product characteristics to one or more external devices, and/or (3) receive from one or more external devices signals operable to control the release component 160 and/or the sensing module 170 of the cultivation apparatus 100, as further described herein.

The first member 120 of the cultivation apparatus 100 can be any suitable shape, size, and/or configuration. For example, in some embodiments, the first member 120 can be a ring-like shape, triangular shape, disc, sphere, cylinder, cone, toroid, cuboid, polyhedral or any other geometrical shape. In some embodiments, the first member 120 can be an irregular shape. In some embodiments, one or more portions of the first member 120 can be formed of a porous and/or hollow material configured to provide buoyancy to the various components of the apparatus 100. In some embodiments, one or more portions of the first member 120 can be formed of a material relatively permeable to oxygen, carbon dioxide, water, and water-soluble nutrients to enable target product growth. In some embodiments, one or more portions of the first member 120 can be formed of a relatively transparent material configured to allow absorption visible light. For example, in some embodiments the first member 120 can be formed of a hollow external structure or shell made of a dense and/or water impermeable material such as a plastic, glass, quartz and/or ceramic materials, that defines an interior volume suitable for disposing a gas such as air, and/or target product. In other embodiments, the first member 120 can be formed of a core structure made of a porous material such as a mycelium or closed cell polyethylene foam, surrounded by a rigid, abrasion resistant layer such as a polyurethane skin or shell.

In some embodiments, the first member 120 of the cultivation apparatus 100 can be any type of buoy such as a navigation buoy, a mooring buoy, a shot buoy, a spar buoy, and the like. In some embodiments, the first member 120 can contain air and/or other gases. In some embodiments, the air and/or gas can be pressurized. In some embodiments, the first member 120 of the cultivation apparatus 100 can be configured to degrade after some minimum period of intended lifetime, allowing the contained air and/or other gases to escape. For example, in some embodiments, the first member 120 can be formed of an ocean compatible material designed to decompose and sink after some minimum intended period of target product growth. In some embodiments, the entire first member 120 or portions thereof can be made of an ocean compatible material including but not limited to jute, sisal, cotton, hemp, polyglycolide, polylactide, polyhydroxobutyrate, chitosan, hyaluronic acid, poly (lactic-co-glycolic), poly (caprolactone), polyhydroxyalkanoate poly(lactic acid), poly(caprolactone), poly (orthoester), polycyanoacrylate, aluminum, carbon steel, stainless steel, galvanized steel, and/or brass, and/or combinations thereof. In some embodiments, the first member 120 can be an inflatable bladder or vesicle. In some embodiments, the bladder can include a mechanical or biological timer/valve configured to release gas contained in the bladder after a predetermined period of time or target product growth, thereby causing it to lose buoyancy and sink to the sea bottom.

In some embodiments, the first member 120 can be have a first portion made of a material that degrades at a first degradation rate, and a second portion made of a material that degrades at a second degradation rate. As the first portion degrades, water can enter the first member 120 causing it to lose buoyancy and sink to the sea bottom. After sinking to the sea bottom, the second portion of the first member 120 can degrade at the second degradation rate over a longer period of time. In some embodiments, the first member 120 can include an engineered "defect" that degrades at a faster rate than the rest of the first member 120. For example, the engineered defect can include a thinned portion of wall of the first member 120, or a stress fracture. The engineered defect can cause the first member 120 to lose buoyancy prior to degradation of the entire first member 120.

In some embodiments, the first member 120 of the cultivation apparatus 100 can be optionally configured to accumulate or cultivate one or more species of target product. For example, in some embodiments, one or more portions of the first member 120 can include a growth substrate (not shown) configured to provide the nutrients suitable for target product growth. In some embodiments, the first member 120 growth substrate can include an enriched seawater medium, pasteurized seawater, filtrated seawater, seawater mixed with buffer solutions including but not limited to sodium nitrate ($NaNO_3$) solution, potassium dihydrogen phosphate ($KH_2PO_4$) solution, and/or the like. In some embodiments, the first member 120 growth substrate can include a binder configured to facilitate attachment of the target product to the growth substrate. In some embodiments, the first member 120 growth substrate can be formed of a fibrous material configured to facilitate attachment of the target product to the first member 120. In some embodiments, the first member 120 growth substrate can include additives formulated to suppress and/or reduce contamination of target product gametophytes and/or sporophytes. For example, in some embodiments, the first member 120 growth substrate can include germanium dioxide ($GeO_2$).

In some embodiments, one or more portions of the first member 120, including the growth substrate, can be inoculated with a plurality of diazotroph microorganisms including single-celled archaea organisms, bacteria such as cyanobacteria, azotobacter, rhizobia, Frankia and the like (e.g., microbiota), capable of converting molecular nitrogen ($N_2$) from air into ammonia ($NH_3$) (e.g., fixing nitrogen). In some embodiments, one or more portions of the first member 120 can be sprayed with a fertilizer formulated to accelerate growth of the species of target product gametophytes and/or sporophytes, and to improve the adherence of the species of target product to the first member 120 by introducing rheology modifiers, agglutinants, and other additives including glycerol, molasses, high molecular weight polysaccharides, and other polymeric materials such as polyethylene oxide.

The first member 120 of the cultivation apparatus 100 can be fabricated using one or more techniques and/or methods well known in the art such as thermo-lamination, encapsulation, rotational molding, casting, vacuum forming, and/or injection molding. For example, in some embodiments the first member 120 can be fabricated by a process that includes thermo-laminating a sheet of a closed-cell polyethylene foam rolled around an internal steelwork or central structure such as a rod or cylinder, and then coating and/or encapsulating the resulting material with a layer of a tough, abrasion resistance polyurethane skin. In other embodiments, the first member 120 can be fabricated by injection molding a frame having a predetermined geometrical shape, size, and configuration, enclosing at least a portion of the produced frame with low density foam material, and encapsulating, covering and/or coating the resulting structure with a dense abrasion resistance skin or shell. In some embodiments, the first member 120 and the second member 140 of the cultivation apparatus 100 can be produced in separate fabrication procedures and then be directly joined and/or coupled together using one or more coupling mechanisms including, but not limited to screws, bolt fasteners, welding, brazing, adhesives, or any combination thereof. Alternatively, in some embodiments, the first member 120 and the second member 140 of the cultivation apparatus 100 can each be coupled and/or joined to the optional release component 160, as further described herein.

In some embodiments, the diameter of the first member 120 can be less than 30 inches, less than 20 inches, less than 15 inches, less than 10 inches, less than 10.5 inches, less than 8 inches, less than 7 inches, less than 6 inches, less than 5 inches. In some embodiments, the diameter of the first member 120 can be in the range of about 5 inches to about 15 inches, about 6 inches to about 20 inches, about 9 inches to about 30 inches, about 6 inches to about 10.5 inches inclusive of all values and ranges therebetween.

In some embodiments, the first member 120 can be a buoy made of a material with a thickness of about 0.02 inches, about 0.03 inches, about 0.04 inches, about 0.05 inches, about 0.06 inches, about 0.125 inches, about 0.141 inches, about 0.156 inches, about 0.172 inches, about 0.188 inches, about 0.250 inches, about 0.313 inches, or about 0.406 inches. In some embodiments, the first member 120 can be a buoy made of a material with a thickness in the range of about 0.02 inch to about 0.125 inch, about 0.04 inch to about 0.250 inch, about 0.141 inch to about 0.406 inch, inclusive of all values and ranges therebetween.

In some embodiments, the volume of the first member 120 can be less than 900 cubic inches, less than less than 800 cubic inches, less than 700 cubic inches, less than 600 cubic inches, less than 500 cubic inches, less than 400 cubic inches, less than 300 cubic inches, less than 150 cubic inches. In some embodiments, the volume of the first member 120 can be in the range of about 100 cubic inches to about 200 cubic inches, about 200 cubic inches to about 400 cubic inches, about 300 cubic inches to about 700 cubic inches, about 500 cubic inches to about 900 cubic inches, inclusive of all values and ranges therebetween.

The second member 140 of the cultivation apparatus 100 can be any suitable shape, size, and/or configuration. For example, in some embodiments, the second member 140 can be formed of a fibrous material or seeding line configured to attach, fix and/or secure the target product gametophytes and/or sporophytes. In some embodiments, the second member 140 can be mechanically coupled to the first member 120 to provide buoyancy to the target product attached to the second member 140. In some embodiments, the second member 140 can be mechanically coupled to the first member 120 by means of tie knots, thimble kits, hooks, and/or similar anchor points devices. In some embodiments, the seeding line can be made of ocean compatible materials including jute, sisal, cotton, hemp, polyglycolide, polylactide, polyhydroxobutyrate, chitosan, hyaluronic acid, poly (lactic-co-glycolic), poly (caprolactone), polyhydroxyalkanoate poly(lactic acid), poly(caprolactone), poly (orthoester), polycyanoacrylate, aluminum, carbon steel, stainless steel, galvanized steel, brass and the like. In other embodiments, the second member 140 can be mechanically coupled to the optional release component 160, as further described herein.

The second member 140 can be configured to accumulate or cultivate one or more species of target product gametophytes and/or sporophytes. For example, in some embodiments, one or more portions of the second member 140 can include a growth substrate (not shown) configured to provide the nutrients suitable for target product growth. In some embodiments, the second member 140 growth substrate can include a binder configured to facilitate attachment of the to the growth substrate. In some embodiments, the second member 140 can include additives formulated to suppress contamination of target product gametophytes and/or sporophytes. For example, in some embodiments, the second member 140 can include germanium dioxide ($GeO_2$). In some embodiments, the seeding line can be co-winded, coiled, and/or intertwined with an iron or an iron-containing thread, filament, or string to provide negative buoyancy to the apparatus 100 and/or provide a source of iron (Fe) nutrient to the target product gametophytes and/or sporophytes.

In some embodiments, one or more portions of the second member 140 can be inoculated with a plurality of diazotroph microorganisms including single-celled archaea organisms, bacteria such as cyanobacteria, azotobacter, rhizobia, Frankia and the like (e.g., microbiota), capable of converting molecular nitrogen ($N_2$) from air into ammonia ($NH_3$) (e.g., fixing nitrogen). In some embodiments, one or more portions of the second member 140 can be sprayed with a fertilizer formulated to accelerate growth of the species of target product gametophytes and/or sporophytes, and to improve the adherence of the species of target product to the second member 140 by introducing rheology modifiers, agglutinants, and other additives including glycerol, molasses, high molecular weight polysaccharides, and other polymeric materials such as polyethylene oxide.

In some embodiments, the shape, size, and/or configuration of the second member 140 can be similar to or substantially the same as the shape, size, and/or configuration of the first member 120. For example, in some embodiments the second member 140 can be a ring-like shape, triangular shape, disc, sphere, cylinder, cone, toroid, cuboid, polyhedral or any other geometrical shape. In some embodiments, the second member 140 can be an irregular shape. In some embodiments, one or more portions of the second member 140 can be formed of a porous and/or hollow material configured to provide buoyancy. In some embodiments, one or more portions of the second member 140 can be formed of a material relatively permeable to oxygen, carbon dioxide, water, and water-soluble nutrients to enable target product growth. In some embodiments, one or more portions of the second member 140 can be formed of a relatively transparent material configured to allow absorption visible light.

In some embodiments, one or more portions of the second member 140 can include a growth substrate (not shown) configured to provide the nutrients suitable for target product growth. In some embodiments, the second member 140 growth substrate can include an enriched seawater medium, pasteurized seawater, filtrated seawater, seawater mixed with buffer solutions including but not limited to sodium nitrate ($NaNO_3$) solution, potassium dihydrogen phosphate ($KH_2PO_4$) solution, and/or the like. In some implementations, the composition of the second member 140 growth substrate can be similar to or substantially the same as the composition of the optional first member 120 growth substrate. In other implementations, the composition of the second member 140 growth substrate can be different than the first member 120 growth substrate. For example, in some implementations, the composition of the first member 120 growth substrate can be tailored and/or selected based on desired characteristics associated with a first group of species while the composition of the second member 140 growth substrate can be tailored and/or selected based on desired characteristics associated with a second group of species, which may be similar to or different than the compositional characteristics of the first member 120 growth substrate.

The cultivation apparatus 100 can be used to seed species of target product that may be utilized in harvesting operations and/or carbon sequestration. For example, in some embodiments, the first member 120 can be configured to provide buoyancy to the apparatus 100, and the second member 140 can accumulate or cultivate one or more species of target product gametophytes and/or sporophytes. The cultivation apparatus 100 can be first seeded with the selected species of target product, and then deployed on oceans, lakes, rivers, and/or any other suitable body of water. The cultivation apparatus 100 can be configured to be positively buoyant when initially deployed on oceans, lakes, rivers, and/or any other suitable body of water, and remain positively buoyant for a period of time to facilitate growth of the selected species of target product disposed on the apparatus 100. In some embodiments, the cultivation apparatus 100 can be further configured to be tracked, located, and/or accessed for target product harvesting purposes via the communications module 180, as further disclosed herein. In some instances, the cultivation apparatus 100 can be accessed for harvesting purposes after a predetermined period of time has elapsed, or after a predetermined amount of growth of the selected species of target product has been achieved. Alternatively, in other instances, the cultivation apparatus 100 can be further configured to sink entirely after a predetermined amount of time has elapsed, and/or after the selected species of target product have grown and obtained a predetermined amount of mass, effectively sequestering the carbon dioxide associated with the grown target product, as further disclosed herein.

Alternatively, in some embodiments, the first member 120 and/or the second member 140 of the cultivation apparatus 100 can be first seeded with one or more species of target product gametophytes and/or sporophytes, and then deployed on oceans, lakes, rivers, and/or any other suitable body of water. The apparatus 100 can be configured to be positively buoyant when initially deployed on oceans, lakes, rivers, and/or any other suitable body of water, and remain positively buoyant for a period of time to facilitate growth of the selected species of target product disposed on the apparatus 100. In some embodiments, the release component 160 of the cultivation apparatus 100 can be configured to degrade and mechanically separate, disconnect, detach, release and/or decouple from the first member 120 from the second member 140 after a predetermined amount of time has elapsed, after the selected species of target product have grown and obtained a predetermined amount of mass, and/or after a signal or group of signals operable to actuate the release component 160 have been received by the communications module 180, causing the first member 120 to float and the second member 140 to sink, as further described herein. The first member 120 can be then retrieved and/or reused and the second member 140 sinks to the sea bottom and sequesters carbon dioxide associated with the grown target product.

In some embodiments, the first member 120 of the apparatus 100 can accumulate or cultivate target product species that become positively buoyant as they mature, and the second member 140 of the apparatus 100 can accumulate or cultivate target product species that become negatively buoyant as they mature. In some embodiments, the apparatus 100 can be first seeded with positively and negatively buoyant target product gametophytes and/or sporophytes, and then deployed on oceans, lakes, rivers, and/or any other suitable body of water. The apparatus 100 can be further configured to be positively buoyant when initially deployed on oceans, lakes, rivers, and/or any other suitable body of water. In some embodiments, the apparatus 100 can be configured to float for a predetermined period of time after being deployed on oceans, lakes, rivers and/or any other body of water, and then gradually sink as the second member 140 seeded with negatively buoyant target product grows and obtains mass.

The release component 160 of the cultivation apparatus 100 can be any suitable shape, size, and/or configuration. For example, in some embodiments, the release component 160 can be a ring-like shape, triangular shape, sphere, disc, cylinder, cone, toroid, cuboid, polyhedral or any other geometrical shape. In some embodiments, the release component 160 can be a plug, stopper, cork, or the like, mechanically coupled to the first member 120, and configured to maintain a gas tight seal that prevents air and/or other gases contained in the first member 120 to escape for a period of time. In some embodiments, the release component 160 can be mechanically coupled to the first member 120 by a pressure fitting, a screw-in sight, an expansion plug and the like. In some embodiments, the release component 160 can be an adhesive patch, glue, or paste, configured to seal an opening on the first member 120 for a period of time. In some embodiments, the release component 160 can be formed of an ocean compatible material configured to decompose after some minimum period of intended lifetime, allowing contained air and/or other gases to escape or be released from the first member 120 and causing the cultivation apparatus 100 to sink. For example, in some embodiments, the release component 160 or a portion thereof can be made of a material such as Zinc that degrades or decomposes at a predictable and reproducible rate, allowing air to escape the first member 120 and/or allowing water to permeate or infiltrate the first member 120 causing the apparatus 100 to sink. Alternatively, in some embodiments, the release member 160 can be configured to include a first portion or component made of a material that degrades or decomposes at a predictable and reproducible rate such as Zinc, and a second portion or component that is (1) mechanically coupled to the first portion or component, and (2) comprises an alkali metal such Sodium (Na), Potassium (K), Lithium (Li), Rubidium (Rb), Cesium (Cs) Francium (Fr) or a combination thereof, which reacts vigorously and violently with water crushing the release component 160 and allowing air to escape the first member 120 and/or water to permeate the first member 120 causing the apparatus 100 to sink.

In some embodiments, one or more portions of the release component 160 can be configured to mechanically couple the first member 120 to the second member 140 for at least a period of time. In other words, in some embodiments the release component 160 can be configured to join, interconnect, and/or couple the first member 120 and the second member 140 of the cultivation apparatus 100 for at least a period of time. In some embodiments, the release component 160 (or portions thereof) can be configured to degrade and mechanically separate, disconnect, detach, release and/or decouple the first member 120 from the second member 140. In some embodiments, one or more portions of the release component 160 can be formed of any suitable degradable material such as, for example, those described herein with respect to specific embodiments. It should be understood, however, that the release component 160 can be formed of any suitable material and therefore, the material of the release component 160 is not intended to be limited to those materials shown and described herein. For example, in some embodiments, one or more portions of the release component 160 can be formed of polyglycolide, polylactide, polyhydroxobutyrate, chitosan, hyaluronic acid, poly(lactic-co-glycolic), poly (caprolactone), polyhydroxyalkanoate, or any other ocean compatible material. In other embodiments, one or more portions of the release component 160 can be formed of Ecoflex®, Ecovio®, or any other compostable co-polyester. In some embodiments, the release component 160 can be formed of cellulose-based materials.

In some embodiments, the release component 160 can be a shape and size substantially similar to or the same as the shape and size of the first member 120 and/or the second member 140. In some embodiments, the release component 160 can be a band or strip-like shape. In some embodiments, one or more portions of the release component 160 can be formed of an adhesive, glue, paste, cement configured to mechanically couple the first member 120 to the release component 160. In some embodiments, one or more portions of the release component 160 can be formed of an adhesive, glue, paste, cement configured to mechanically couple the second member 140 to the release component intermediate 160. Said in other words, in some embodiments the release component 160 can be configured to join, interconnect, and/or couple the first member 120 and the second member 140 of the cultivation apparatus 100 for at least a period of time.

As described above, in some embodiments, the release component 160 can be configured to degrade after some minimum period of intended lifetime. For example, in some embodiments, the release component 160 can be formed of an ocean compatible material designed to decompose and separate, disconnect, detach, release and/or decouple the first member 120 from the second member 140 after some minimum intended period of target product growth. In some embodiments, the release component 160 can be configured to degrade after some minimum amount of mass has accumulated on the second member 140. In some embodiments, the release component 160 can be configured to degrade under predetermined environmental conditions including but not limited to temperature, pressure, exposure to UV and/or visible light. In some embodiments, the release component 160 can be configured to degrade and decouple the first member 120 from the second member 140 allowing the first member 120 to float, and the second member 140 to sink to the bottom of the seafloor, effectively sequestering the carbon associated with the negatively buoyant target product. In some embodiments, the floating first member 120 facilitates harvesting operations.

The cultivation apparatus 100 can optionally be coupled to, or associated with, a sensing module 170 configured to sense, detect, measure, and/or quantify one or more characteristics relevant to the species of target product disposed on the cultivation apparatus 100. In some embodiments, the sensing module 170 can be mechanically coupled to the cultivation apparatus 100 (e.g., to the first member 120). In some embodiments, the sensing module 170 can be optically coupled to the cultivation apparatus 100. In some embodiments, the sensing module 170 can be electronically coupled to the cultivation apparatus 100. In some embodiments, the sensing module 170 can include one or more sensors configured to sense, detect, and/or measure water temperature, irradiance, dissolved oxygen concentration, concentration of nutrients, concentration of dissolved carbon, salinity, and/or other characteristics related to target product growth. The plant size, plant density, water temperature, irradiance, dissolved oxygen concentration, concentration of nutrients, concentration of dissolved carbon, salinity and/or other characteristics related to target product growth can be sensed and/or detected by the one or more sensors. In some embodiments, data associated with an output of the sensing module 170 sensor(s) can be read by the communications module 180 and be transmitted to an external device. The transmitted data can then be analyzed (e.g., by a control system, an analysis unit, and/or other compute device) to determine target product growth, quantify mass production, and/or mass yield. In other words, data output by the one or more sensors of the sensing module 170 can be analyzed to determine target product growth, mass production, carbon capture and/or sequestration rates, quantities, or capacities, and/or the like, as further described herein.

In some embodiments, the sensing module 170 can include pressure-release depth sensors configured to measure, and/or record the sinking rate of the apparatus 100 as a function of time after the apparatus 100 is seeded with target product gametophytes and/or sporophytes, and deployed on oceans, lakes, rivers, and/or any other suitable body of water. The pressure-release depth sensors can be configured to measure the sinking rate of the apparatus 100, decouple from the apparatus 100 once the apparatus 100 reaches a predetermined depth threshold, emit (via the communications module 180) the sinking rate information recorded via satellite, and return to the surface. In some instances, the sinking rate of the apparatus 100 can be used to quantify the mass and related carbon captured and/or sequestered. In some instances, the pressure-release depth sensors of the sensing module 170 can be used to determine whether the apparatus 100 has sunk below a predetermined depth or threshold associated with and/or suitable for the permanent sequestration carbon.

In some embodiments, the sensing module 170 can be configured to sense, detect, and/or monitor target product growth, mass generation, and/or mass yield upon the apparatus 100 being seeded with target product, and being deployed on oceans, lakes, rivers, and/or any other suitable body of water. In some embodiments, the sensing module 170 can include underwater cameras or other imaging technologies configured to image, record, and/or monitor number of plants and/or heterokonts (e.g., kelp, target product, etc.), number of fronds per heterokont, frond dimensions, and/or density associated to target product growth. For example, in some embodiments the sensing module 170 can include a stereoscopic camera system equipped with two or more lenses comprising separate image sensors to simulate human binocular vision and thus facilitate obtaining images with perception of depth.

In some embodiments, the stereoscopic camera system can be equipped with a rectilinear lenses, fisheye lenses, and/or anamorphic lenses configured to produce detailed images of the target product growing on the cultivation apparatus 100. In some embodiments, the stereoscopic camera system can be configured to perform multiple image post processing steps. For example, in some embodiments the stereoscopic camera system can include a post processing step to analyze the images generated by the lenses and identify and/or correct distortions using algorithms that estimate distortion parameters and camera matrix through the use of, for example, a Lavenberg-Marquardt solver. In some embodiments, the stereoscopic camera system can include multiple post processing steps such as color correction, brightness/contrast, sharpness, backscatter removal, cropping and the like.

In some embodiments, the sensing module 170 can also include cameras equipped with Photosynthetically Active Radiation (PAR) sensors configured to measure photosynthetic light levels in air and water in the 400 to 700 nm range. The PAR sensors can be configured to measure photosynthetic photon flux density (PPFD) or the power of electromagnetic radiation in the visible light spectral range in micromoles of photons per square meter per second. The data captured by the PAR sensors can be used to estimate, determine, and/or quantify the intensity of solar light that is available to the target product disposed on the apparatus 100 for photosynthesis, and thus estimate and/or infer the relative health of the target product and/or the rate of growth of target product as well as other marine organisms.

The images recorded by the cameras of the sensing module 170 can be used to quantify the mass accumulated on the cultivation apparatus 100, as well as to estimate changes in the mass (e.g., rate of mass accumulation), and provide insights that facilitate evaluating the relative the health of the target product. In some embodiments, the images recorded by the sensing module can be transmitted by the communication module 180 to an external device for analysis. In some instances, the images recorded by the sensing module 170 can be analyzed manually (e.g., manual annotation by a user) to determine the amount of mass on the apparatus 100, the rate of growth of target product, and/or the amount of $CO_2$ effectively captured by the mass accumulated on the apparatus 100. For example, in some embodiments, the sensing module 170 can initiate image capture (e.g., record images and/or videos of the target product disposed on the cultivation apparatus 100 at different points in time), post process those images (e.g., adjust color, brightness/contrast, sharpness, backscatter removal, removal of noise, cropping and the like) and transmit via the communications module 180 the images and/or videos for data extraction or annotation by a user, and statistical analysis of the extracted data. In other instances, the images recorded by the sensing module 170 can be analyzed or annotated using computer vision algorithms.

In some embodiments, the sensing module 170 can include cameras equipped with an anti-fouling system configured to detect, prevent and/or minimize the degradation of the various components of the sensing module 170 due to accumulation and/or growth of marine microorganisms, plants, algae or small animals, as well as the microbiologically influenced corrosion (MIC) generated by metabolites of such marine microorganism. In some embodiments, the anti-fouling system can include a detection light source such as a Light-Emitting-Diode (LED) lamp configured to direct a beam of light in the ultraviolet (250-280 nm) range to the lenses and/or other components of the underwater cameras and induce the emission of fluorescence by the microorganisms, plants, algae or small animals fluorophores. The detection light source can be used to trigger a fluorescence response of marine microorganisms deposited on the sensing module 170, which can be detected by one or more cameras equipped with suitable detectors such as a charge-coupled device (CCD), an electron-multiplying charge coupled device (EM-CCD), and/or a complementary metal oxide semiconductor (CMOS) detector. The cameras can quantify the intensity of a fluorescence signal that can be used to evaluate the accumulation of marine microorganisms on the sensing module 170. In some instances, the detection light source can be used to remove at least a fraction of the marine microorganisms accumulated on the sensing module 170 due to the microorganism's low tolerance to the intense UV radiation generated by the detection light source.

In some embodiments, the anti-fouling system can include one or more chemical bactericides or anti-fouling biocides that provide a toxic environment for marine microorganisms. In some embodiments, the components of the sensing module 170 can be coated with a protective layer including one or more anti-fouling biocides including, but not limited to 2-methylthio-4-tertiary-butylamino-6-cyclopropylamino-s-triazine (Irgarol 1051), 1-(3,4-dichlorophenyl)-3,3-dimethylurea (diuron), 4,5-dichloro-2-n-octyl-4-isothiazolin-3-one (DCOIT), N-dichlorofluoromethylthio-N',N'-dimethyl-N-phenylsulphamide (dichlofluanid), N-dichlorofluoromethylthio-N',N'-dimethyl-N-p-tolylsulfamide (tolylfluanid), 2,4,5,6-terachloro iso phthalo nitrile (chlorothalonil), Bis(1hydroxy-2(1H)-pyridethionato-O,S)-T-4 zinc (zinc pyrithione), Bis(1hydroxy-2(1H)-pyridethionato-O,S)-T-4 copper (copper pyrithione), 2-(thiocyanomethyl thio)benzthiazole (TCMTB), 2,3,5,6-tetrachloro-4-(methyl sulphonyl) pyridine (TCMS pyridine), pyridine-triphenylborane (TPBP), cuprous thiocyanate, arsenic trioxide, zineb, folpet, thiram, oxytetracycline hydrochloride, ziram, maneb, and/or a combination thereof.

In some embodiments, the anti-fouling system can include one or more coatings designed to reduce the surface energy (e.g., produce hydrophobic surfaces) of the exposed components of the sensing module 170 including the lenses, and cameras. These coatings can be deposited on the exposed surfaces of the components of the sensing module 170 to limit the ability of the microorganisms to adhere to said components. For example, in some embodiments, the coatings disposed on the components of the sensing module 170 can include non-toxic chemistries with low coefficient of friction and low surface energy (e.g., low surface energy coatings that are hydrophobic and super-hydrophobic) comprising fluoropolymers and silicones such as PDMS silicone elastomers. In some instances, the components of the sensing module 170 can be treated with coatings that reduce the surface energy and include one or more biocides. In other embodiments, the coatings disposed on the components of the sensing module 170 to prevent fouling can include a self-polishing resin with a biocide on the surface. Most common coating systems are based on metals including cuprous oxide and co-biocides such as zinc pyrithione. In some embodiments, the coatings disposed on the components of the sensing module 170 to prevent fouling can include enzyme-based coatings such as peroxide-producing system of hexose oxidase, glucoamylase and starch that reduce the environmental impact.

As described above with reference to FIG. 1, in some embodiments, the cultivation apparatus 100 can be optionally coupled to, or associated with, a communications module 180. In some embodiments, the communications module 180 can be mechanically coupled to the cultivation apparatus 100 (e.g., to the first member 120) and/or the sensing module 170. In some embodiments, the communications module 180 can be mechanically coupled to the first member 120 of the cultivation apparatus 100. In other embodiments, the communications module 180 can be mechanically coupled to the second member 140 of the cultivation apparatus. In some embodiments, the communications module 180 can coupled to a dedicated flotation device such as a foam, a secondary buoy, and or the like. In some embodiments, the flotation device can also serve as a support structure to other components of the communications module including, but not limited to a satellite antenna, or a power source such as a battery or a solar panel. In some embodiments, the communications module 180 can be electronically coupled (i.e., wired or wireless) to the cultivation apparatus 100 and/or the sensing module 170. In some embodiments, the communications module 180 can be powered by one or more solar panels. For example, in some embodiments, the communications module 180 can be powered by a 20W solar panel configured to provide electric power to the various components of the communication module 180. Alternatively, in some embodiments the communications module 180 can have any suitable power source and/or energy storage device. In some embodiments, the power source of the communications module 180 can include one or more rechargeable batteries. In some embodiments, the communications module 180 can include one or more ports that enable connection between an external power source and the communication module 180 as an auxiliary and/or back up power source. In some embodiments, the communications module 180 can be configured to (1) read the one or more characteristics relevant to the target product, (2) transmit signals representative of the cultivation apparatus 100 and/or the target product characteristics to one or more external devices, and/or (3) receive from one or more external devices signals operable to control the release component 160 and/or the sensing module 170 of the cultivation apparatus 100. In some embodiments the apparatus 100 can include one or more tracking devices configured to produce, and/or transmit signals associated with the apparatus 100 relative position upon being seeded with target product and being deployed on oceans, lakes, rivers, and/or any other suitable body of water. The position and/or trajectory of the apparatus 100 can be transmitted, recorded and/or stored (e.g., by the control system, an analysis unit, and/or other compute device) and can be further employed by remote sensing devices to determine and/or quantify (directly or indirectly) target product growth, mass production, and/or carbon capture. For example, in some instances, the apparatus 100 can include a Global Positioning System (GPS) tracking device configured to determine, record, and/or transmit the apparatus 100 geographic location. In other instances, the apparatus 100 can include Radio-Frequency Identification (RFID) devices configured to determine, record, and/or transmit the apparatus 100 geographic location. Alternatively, in some embodiments, the communications module 180 can include a satellite antenna. The geographic location of the apparatus 100 can be further used by remote sensing techniques to determine target product growth, and quantify mass production, mass yield, and carbon capture. For example, in some instances, remote sensing techniques such as near-infrared aerial photography, SPOT multispectral imagery, aerial digital multispectral imaging systems (DMSC) calibrated with ground truthing, and/or airborne hyperspectral systems can be used to quantify mass production, mass yield, and carbon capture. In some instances, trajectory data can be used to determine, calculate, and/or infer mass growth by comparing surface or subsurface conditions (e.g., wind, current, etc.) with subsurface mass motion and/or the like.

In some implementations, mass production, mass yield, target product growth, carbon sequestration capacity per unit mass of target product, and/or the like associated with a farm or system of any number of the seeded apparatus 100 can be calculated, determined, predicted, forecasted, estimated, and/or the like based on a relatively small sample. In some such implementations, such a method or process can include seeding, for example, the apparatus 100 with target product, deploying the apparatus 100 on or in oceans, lakes, rivers, and/or any other suitable body of water, allowing the apparatus 100 to sink as the apparatus 100 gains mass, and then retrieving the apparatus 100 after a predetermined amount of time to measure the weight and dimensions of target product grown. For example, in some instances, the apparatus 100 can be retrieved after a predetermined amount of time after deployment on oceans, lakes, rivers, and/or any other suitable body of water, and the wet weight (i.e., the weight of target product as it is retrieved from the apparatus 100), the dry weight (i.e., the weight of target product after drying under predetermined conditions), and overall dimensions of the target product grown can be measured and quantified.

In some instances, the wet weight, dry weight, dry-to-wet weight ratios, and/or dimensions of target product can be used to quantify and/or determine target product growth characteristics for a given set of environmental variables. In some such implementations, any of the sensors described above can be used, for example, during the growth phase, to sense, detect, and/or otherwise provide data that enables the calculation and/or determination of the set of environmental variables (e.g., water temperature, irradiance, dissolved oxygen concentration, concentration of nutrients, concentration of dissolved carbon, salinity, water current conditions, bacterial blooms, El Niño or La Niña oscillation phases, etc.). Moreover, in some instances, additional analysis can be performed to determine carbon content for the target product, a percentage of carbon present per unit of mass of target product, and/or the like. The percentage of carbon present per unit of mass of target product can be further used to calculate the mass of carbon dioxide captured and/or sequestered by considering the atomic weight of carbon, the atomic weight of oxygen, and the mass of carbon present per unit of mass of target product.

For example, in some instances, a percentage of carbon per unit mass of target product (dry) can be between about 30% and 40%, about 33% and about 39%, and/or about 34% and about 38%. In some instances, the percentage of carbon per unit mass of target product can be between 34.8% and about 37.4%. Thus, for 1 kg of dry target product at 37.4% carbon content, the mass of sequestered carbon is 0.374 kg of carbon. Using the atomic masses of carbon and oxygen, it can be determined that the 0.374 kg mass of carbon corresponds to 1.37 kg of $CO_2$. The calculated dry-to-wet ratio of the target product can then be used to determine a mass of $CO_2$ sequestered per unit mass of wet target product. In some instances, such calculations further can be used to determine, for example, a mass of $CO_2$ sequestered per unit length of target product, and/or any other suitable characteristic. These characteristics can, in turn, be associated with the sensed, determined, and/or detected environmental variables allowing growth and/or carbon sequestration performance to be correlated to environmental variables. Furthermore, based on the calculations, data, and/or performance of the sample, characteristics, performance, etc., of an entire farm (or portion thereof such as a microfarm, assembly of any number of apparatus 100, and/or the like) can be determined, inferred, modeled, etc.

In some instances, such calculations, derivations, correlations, and/or the like can lead to and/or produce a desired level of predictability, foreseeability, and/or the like. The ability to predict and/or forecast growth and/or performance characteristics of the apparatus 100 (and/or a farm including large numbers of the apparatus 100) and/or a capacity to sequester carbon or carbon dioxide can, for example, enable the capacity to be bought and/or sold as a commodity and/or the like. For example, determining a sequestration capacity per unit mass and/or length of target product can allow that capacity to be sold as a carbon credit on a carbon credit market. In some instances, the target product and/or the carbon sequestration capacity can be bought and sold, for example, on a commodities market, a futures market, and/or any other suitable market.

Figure 2:
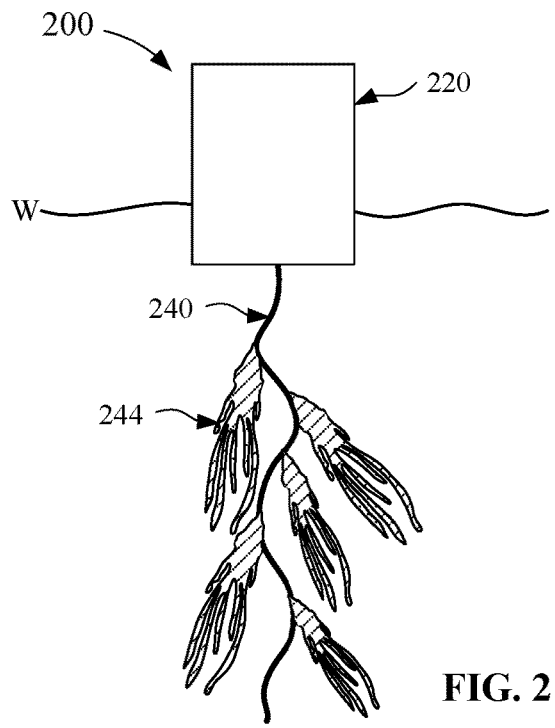
FIG. 2 is a schematic illustration of a target product cultivation apparatus, according to an embodiment.

FIG. 2 illustrates a target product cultivation apparatus 200 according to an embodiment. The target product, as described herein, includes and/or encompasses a wide variety of species including microalgae, macroalgae, plankton, marine bacteria, archaea filter feeders (such as oysters or clams), or crustaceans either for the purpose of bioremediation, eventual cultivation or for sequestering carbon dioxide. The target product cultivation apparatus 200 (also referred to herein as "cultivation apparatus" or "apparatus") can be similar in function to the cultivation apparatus 100 described above with reference to FIG. 1. For example, as described above with reference to the cultivation apparatus 100, the cultivation apparatus 200 can be used to seed species of target product that may be utilized in harvesting operations and/or carbon sequestration. The apparatus 200 can include a first member 220 (also referred to as a ""buoy") configured to provide buoyancy to the various components of the apparatus 200, and a second member 240 configured to accumulate or cultivate one or more species of target product 244.

The first member 220 of the cultivation apparatus 200 can be a flotation device of any suitable shape and/or size. In some embodiments, one or more portions of the first member 220 can be formed of a porous and/or hollow material configured to provide buoyancy to the various components of the apparatus 200. In some embodiments, the first member 220 can be any type of buoy such as a navigation buoy, a mooring buoy, a shot buoy, a spar buoy, and the like. In some embodiments, the first member 220 can contain air and/or other gases. In some embodiments, the air and/or gas can be pressurized. In some embodiments, one or more portions of the first member 220 can be formed of a relatively transparent material configured to allow transmission of visible light, facilitating absorption of light by the target product 244.

In some embodiments, the first member 220 can be configured to degrade after some minimum period of intended lifetime, allowing the contained air and/or other gases to escape. For example, in some embodiments, the first member 220 can be formed of an ocean compatible material designed to decompose and sink after some minimum intended period of target product growth. In some embodiments, the entire first member 220 or portions thereof can be made of an ocean compatible material including but not limited to jute, sisal, cotton, hemp, polyglycolide, polylactide, polyhydroxybutyrate, chitosan, hyaluronic acid, poly (lactic-co-glycolic), poly (caprolactone), polyhydroxyalkanoate poly(lactic acid), poly(caprolactone), poly (orthoester), polycyanoacrylate, aluminum, carbon steel, stainless steel, galvanized steel, brass, and/or a combination thereof. In some embodiments, the first member 220 can be an inflatable bladder or vesicle (not shown). In some embodiments, the bladder can include a mechanical or biological timer/valve configured to release gas contained in the bladder after a predetermined period of time or target product growth, thereby causing it to lose buoyancy and sink to the sea bottom.

In some embodiments, the first member 220 can be have a first portion made of a material that degrades at a first degradation rate, and a second portion made of a material that degrades at a second degradation rate. As the first portion degrades, water can enter the first member 220 causing it to lose buoyancy and sink to the sea bottom. After sinking to the sea bottom, the second portion of the first member 220 can degrade at the second degradation rate over a longer period of time. In some embodiments, the first member 220 can include an engineered "defect" that degrades at a faster rate than the rest of the first member 220. For example, the engineered defect can include a thinned portion of wall of the first member 220, or a stress fracture. The engineered defect can cause the first member 220 to lose buoyancy prior to degradation of the entire first member 220.

The second member 240 of the cultivation apparatus 200 can be any suitable shape, size, and/or configuration. The second member 240 can be any type of material suitable for attachment of target product 244. In some embodiments, the second member 240 can be formed of a fibrous material or seeding line configured to facilitate attachment of the target product 244, as shown in FIG. 2. The second member 240 can be mechanically coupled to the first member 220 to provide buoyancy to the target product attached to the seeding line. In some embodiments, the second member 240 can be mechanically coupled to the first member 220 by means of tie knots, thimble kits, hooks, and/or similar anchor points devices. In other embodiments, the second member 240 can be mechanically coupled to the first member 220 using one or more coupling mechanisms including, but not limited to screws, bolt fasteners, welding, brazing, adhesives, or any combination thereof. The second member 240 and/or the anchor point devices can be made of ocean compatible materials including jute, sisal, cotton, hemp, polyglycolide, polylactide, polyhydroxybutyrate, chitosan, hyaluronic acid, poly(lactic-co-glycolic), poly (caprolactone), polyhydroxyalkanoate poly(lactic acid), poly(caprolactone), poly(orthoester), polycyanoacrylate, aluminum, carbon steel, stainless steel, galvanized steel, brass and the like. As shown in FIG. 2, the second member 240 can include a single seeding line coupled to the first member 220. In some embodiments, the second member 240 can include a first seeding line coupled to the first member 220, and additional seeding lines (not shown) coupled to the first seeding line and/or to the first member 220 and configured to extend the amount of space available for attachment of target product.

As disclosed above, the second member 240 can be configured to accumulate or cultivate one or more second species of target product 244. In some embodiments, the second member 240 can include a binder configured to reinforce attachment of the 244 to the second member 240. In some embodiments, the second member 240 can include additives formulated to suppress contamination of target product 244. For example, in some embodiments, the second member 240 can include germanium dioxide ($GeO_2$). In some embodiments, the second member 240 can be co-winded, coiled, and/or intertwined with an iron or an iron-containing thread, filament, or string to provide negative buoyancy to the apparatus 200 and/or provide a source of iron (Fe) nutrient to the target product 244. In some embodiments, one or more portions of the second member 240 can be inoculated with a plurality of diazotroph microorganisms including single-celled archaea organisms, bacteria such as cyanobacteria, azotobacter, rhizobia, Frankia and the like (e.g., microbiota), capable of converting molecular nitrogen ($N_2$) from air into ammonia ($NH_3$) (e.g., fixing nitrogen). In some embodiments, one or more portions of the second member 240 can be sprayed with a fertilizer formulated to accelerate growth of the species of target product 244, and to improve the adherence of the species of target product 244 to the second member 240 by introducing rheology modifiers, agglutinants, and other additives including glycerol, molasses, high molecular weight polysaccharides, and other polymeric materials such as polyethylene oxide.

As described above with reference to the cultivation apparatus 100, the cultivation apparatus 200 can be used to seed species of target product that may be utilized in harvesting operations and/or carbon sequestration. In some embodiments, the cultivation apparatus 200 can accumulate or cultivate one or more species of target product 244, and then deployed on oceans, lakes, rivers, and/or any other suitable body of water. The apparatus 200 can be configured to float on or near the surface of the water line W when initially deployed on oceans, lakes, rivers and/or any other body of water, to facilitate absorption of UV light, $O_2$ and/or nutrients associated with and/or otherwise facilitating target product growth. In some embodiments, the cultivation apparatus 200 can be configured to be accessed for target product harvesting purposes after a predetermined period of time has elapsed, or after a predetermined amount of growth of the selected species of target product has been achieved. Alternatively, in other embodiments, the first member 220 (or portions thereof) can be configured to degrade after a predetermined minimum amount of the target product has accumulated on the second member 240, causing the entire apparatus 200 to sink and sequester carbon associated with the target product mass.

In some embodiments, the cultivation apparatus 200 can include a first member 220 configured to exhibit a maximum predetermined magnitude of buoyant force operable to counteract and/or balance a maximum threshold of downward (e.g., sinking force) exerted by the second member 240 coupled to the first member 220 of the apparatus 200. In other words, the first member 220 can be configured to have a maximum buoyancy capacity operable to maintain and float the second member 240. In some embodiments, the cultivation apparatus 200 can accumulate or cultivate one or more species of negatively buoyant target product, and then deployed on oceans, lakes, rivers, and/or any other suitable body of water. The apparatus 200 can be configured to float on or near the surface of the water line W when initially deployed on oceans. Under those circumstances, the first member 220 can exhibit a buoyant force that exceeds and/or matches the downward (e.g., sinking) forces exerted on the first member 220 by the target product and/or the second member 240 of the apparatus 200. As the target product gains mass, the weight of the second member 240 and/or the downward forces exerted by the negatively buoyant target product can eventually match and/or surpass the maximum buoyant force or buoyancy capacity of the first member 220, forcing the apparatus 200 to start sinking.

In some embodiments, the first member 220 can be configured to resist a maximum amount of pressure Pm, after which the first member 220 can begin to leak and loose buoyancy. In some instances, the cultivation apparatus 200 can be configured to float on or near the surface when initially deployed in a on oceans, lakes, rivers, and/or any other suitable body of water, and then sink to first depth below the surface in response to the negatively buoyant target product disposed on the second member 240 gaining mass. At that point, any additional growth of target product can cause the cultivation apparatus 200 to sink to a second depth at which external pressure on the first member 220 exceeds the maximum pressure Pm causing the first member 220 to leak or rupture and rapidly sink to the seafloor.

In some embodiments, the cultivation apparatus 200 can be seeded with one or more species of positively buoyant target product 244 and then deployed on oceans, lakes, rivers, and/or any other suitable body of water. The apparatus 200 can be configured to float on or near the surface of the water line W when deployed on oceans, lakes, rivers and/or any other body of water, due to the positive buoyancy of the target product 244 and the buoyancy capacity of the first member 220. In some embodiments, the cultivation apparatus 200 can be configured to be accessed for target product harvesting purposes after a predetermined period of time has elapsed, or after a predetermined amount of growth of the selected target product has been achieved. Since the target product 244 is positively buoyant, the target product 244 can be harvested from a boat and/or a vessel. Alternatively, in other embodiments, the first member 220 (or portions thereof) can be configured to degrade, fail and/or leak becoming negatively buoyant. For example in some embodiments, the first member 220 (or portions thereof) can be configured to degrade allowing contained air and/or other gases to escape (or be released) from the first member 220, allowing water to enter the first member 220, which in turns makes the first member negatively buoyant (e.g., acting like an anchor) and causes the cultivation apparatus 200 to sink and sequester carbon associated with the target product mass.

Figure 3A:
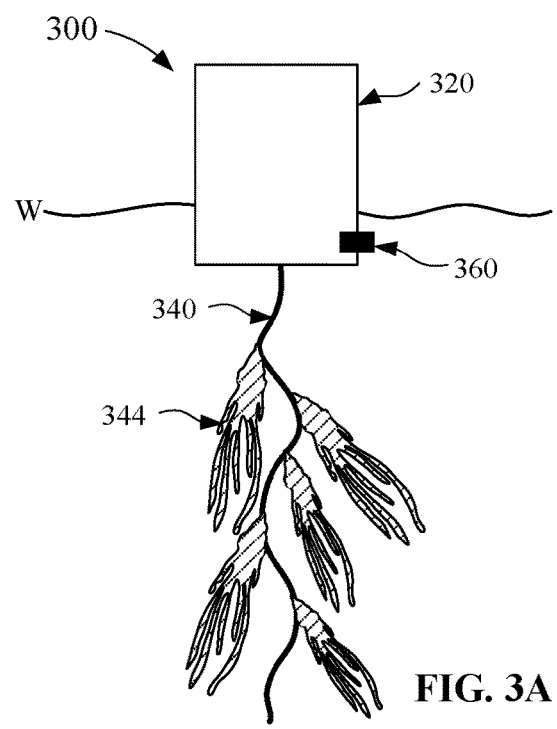
FIG. 3A is a schematic illustration of a target product cultivation apparatus, according to an embodiment.

FIG. 3A illustrates a target product cultivation apparatus 300 according to an embodiment. The target product, as described herein, includes and/or encompasses a wide variety of species including microalgae, macroalgae, plankton, marine bacteria, archaea filter feeders (such as oysters or clams), or crustaceans either for the purpose of bioremediation, eventual cultivation or for sequestering carbon dioxide. The target product cultivation apparatus 300 (also referred to herein as "cultivation apparatus" or "apparatus") can be similar in form and/or function to the cultivation apparatus 100, and/or 200 described above. For example, as described above with reference to the cultivation apparatus 100, the cultivation apparatus 300 can be used to seed species of target product that may be utilized in harvesting operations and/or carbon sequestration. The apparatus 300 can include a first member 320 (also referred to as a "buoy") configured to provide buoyancy to the various components of the apparatus 300, a second member 340 configured to accumulate or cultivate one or more species of target product 344, and a release component 360 configured to seal the first member 320 from the external environment.

The first member 320 can be a flotation device of any suitable shape and/or size. In some embodiments, one or more portions of the first member 320 can be formed of a porous and/or hollow material configured to provide buoyancy to the various components of the apparatus 300. In some embodiments, the first member 320 can be any type of buoy such as a navigation buoy, a mooring buoy, a shot buoy, a spar buoy, and the like. In some embodiments, the first member 320 can contain air and/or other gases. In some embodiments, the air and/or gas can be pressurized. In some embodiments, one or more portions of the first member 320 can be formed of a relatively transparent material configured to allow transmission of visible light, facilitating absorption of light by the target product 344. In some embodiments, the first member 320 or portions thereof be made of ocean compatible materials including but not limited to, polyglycolide, polylactide, polyhydroxybutyrate, chitosan, hyaluronic acid, poly(lactic-co-glycolic), poly (caprolactone), polyhydroxyalkanoate poly(lactic acid), poly(caprolactone), poly(orthoester), polycyanoacrylate, aluminum, carbon steel, stainless steel, galvanized steel, brass, and/or a combination thereof.

The second member 340 of the cultivation apparatus 300 can be any suitable shape, size, and/or configuration. The second member 340 can be any type of material suitable for attachment of target product 344. In some embodiments, the second member 340 can be formed of a fibrous material or seeding line configured to facilitate attachment of the target product 344, as shown in FIG. 3A. The second member 340 can be mechanically coupled to the first member 320 to provide buoyancy to the target product attached to the seeding line. In some embodiments, the second member 340 can be mechanically coupled to the first member 320 by means of tie knots, thimble kits, hooks, and/or similar anchor points devices. In other embodiments, the second member 340 can be mechanically coupled to the first member 320 using one or more coupling mechanisms including, but not limited to screws, bolt fasteners, welding, brazing, adhesives, or any combination thereof. The second member 340 and/or the anchor point devices can be made of ocean compatible materials including jute, sisal, cotton, hemp, polyglycolide, polylactide, polyhydroxybutyrate, chitosan, hyaluronic acid, poly(lactic-co-glycolic), poly (caprolactone), polyhydroxyalkanoate poly(lactic acid), poly(caprolactone), poly(orthoester), polycyanoacrylate, aluminum, carbon steel, stainless steel, galvanized steel, brass and the like. As shown in FIG. 3A, the second member 340 can include a single seeding line coupled to the first member 320. In some embodiments, the second member 340 can include a first seeding line coupled to the first member 320, and additional seeding lines (not shown) coupled to the first seeding line and/or to the first member 320 and configured to extend the amount of space available for attachment of target product.

As disclosed above, the second member 340 can be configured to accumulate or cultivate one or more second species of target product 344. In some embodiments, the second member 340 can include a binder configured to reinforce attachment of the 344 to the second member 340. In some embodiments, the second member 340 can include additives formulated to suppress contamination of target product 344. For example, in some embodiments, the second member 340 can include germanium dioxide ($GeO_2$). In some embodiments, the second member 340 can be co-winded, coiled, and/or intertwined with an iron or an iron-containing thread, filament, or string to provide negative buoyancy to the apparatus 300 and/or provide a source of iron (Fe) nutrient to the target product 344. In some embodiments, one or more portions of the second member 340 can be inoculated with a plurality of diazotroph microorganisms including single-celled archaea organisms, bacteria such as cyanobacteria, azotobacter, rhizobia, Frankia and the like (e.g., microbiota), capable of converting molecular nitrogen ($N_2$) from air into ammonia ($NH_3$) (e.g., fixing nitrogen). In some embodiments, one or more portions of the second member 340 can be sprayed with a fertilizer formulated to accelerate growth of the species of target product 344, and to improve the adherence of the species of target product 344 to the second member 340 by introducing rheology modifiers, agglutinants, and other additives including glycerol, molasses, high molecular weight polysaccharides, and other polymeric materials such as polyethylene oxide.

Figure 3B:
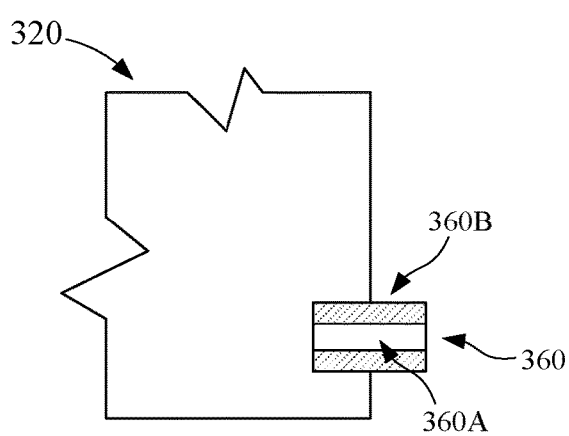
FIG. 3B is a schematic illustration of a portion of a target product cultivation apparatus, according to an embodiment.

The release component 360 of the cultivation apparatus 300 can be any suitable shape, size, or configuration. In some embodiments, the release component 360 can be a plug, stopper, cork, or the like, mechanically coupled to the first member 320, and configured to maintain a gas tight seal that prevents air and/or other gases contained in the first member 320 to escape. In some embodiments, the release component 360 can be mechanically coupled to the first member 320 by a pressure fitting, a screw-in sight, an expansion plug and the like. In some embodiments, the release component 360 can include an adhesive patch, glue, or paste, configured to seal an opening on the first member 320 for a period of time. In some embodiments, the release component 360 can be formed of an ocean compatible material configured to decompose after some minimum period of intended lifetime, allowing contained air and/or other gases to escape from the first member 320 and causing the cultivation apparatus 300 to sink. For example, in some embodiments, the release component 360 or a portion thereof can be made of a material such as Zinc that degrades or decomposes at a predictable and reproducible rate, allowing air to escape the first member 320 and/or allowing water to permeate or infiltrate the first member 320 causing the apparatus 300 to sink. As shown in FIG. 3B, in some embodiments, the release member 360 can be configured to include a first portion or component 360A made of a material that degrades or decomposes at a predictable and reproducible rate such as Zinc, and a second portion or component 360B that is (1) mechanically coupled to the first portion or component, and (2) comprises an alkali metal such Sodium (Na), Potassium (K), Lithium (Li), Rubidium (Rb), Cesium (Cs) Francium (Fr) or a combination thereof, which reacts vigorously and violently with water crushing the release component 360 and allowing air to escape the first member 320 and/or water to permeate the first member 320 causing the apparatus 300 to sink.

In some embodiments, the release component 360 can be configured to degrade after minimum amount of mass has accumulated on the second member 340. In some embodiments, the release component 360 can be configured to degrade under predetermined environmental conditions including but not limited to, temperature, pressure, exposure to UV and/or visible light.

As described above, the cultivation apparatus 300 can be used to seed species of target product that may be utilized in harvesting operations and/or carbon sequestration. In some embodiments, the cultivation apparatus 300 can be first seeded with one or more species of target product 344, and then deployed on oceans, lakes, rivers, and/or any other suitable body of water. The apparatus 300 can be configured to float on or near the surface of the water line W when initially deployed on oceans, lakes, rivers and/or any other body of water, to facilitate absorption of UV light, $O_2$ and/or nutrients associated with and/or facilitating target product growth. In some embodiments, the cultivation apparatus 300 can be configured to be accessed for target product harvesting purposes after a predetermined period of time has elapsed, or after a predetermined amount of growth of the selected species of target product has been achieved. In some embodiments, the release component 360 can be configured to degrade after a minimum amount of target product has accumulated on the second member 340, allowing air and/or other gases contained in the first member 320 to escape and/or water to permeate the first member 340, causing the cultivation apparatus 300 to sink to the sea bottom, effectively sequestering carbon associated with the target product mass.

Figure 4:
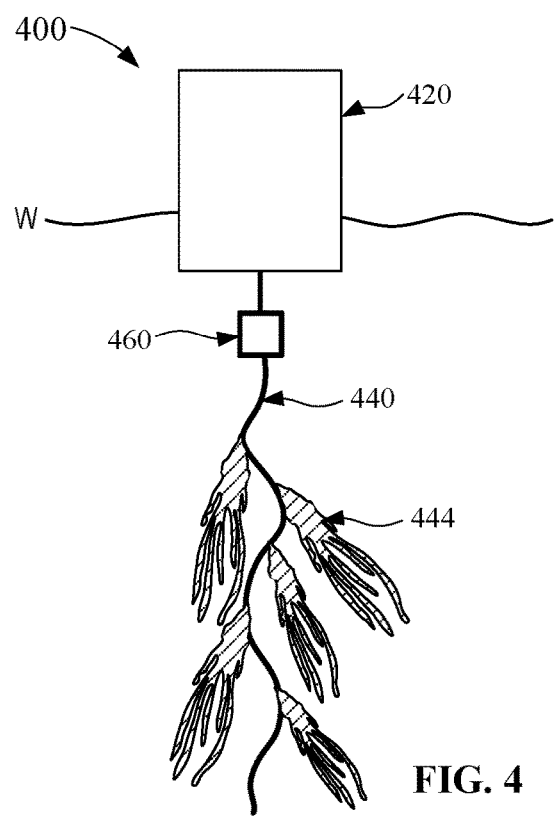
FIG. 4 is a schematic illustration of a target product cultivation apparatus, according to an embodiment.

FIG. 4 illustrates a target product cultivation apparatus 400 according to an embodiment. The target product, as described herein, includes and/or encompasses a wide variety of species including microalgae, macroalgae, plankton, marine bacteria, archaea filter feeders (such as oysters or clams), or crustaceans either for the purpose of bioremediation, eventual cultivation or for sequestering carbon dioxide. The target product cultivation apparatus 400 (also referred to herein as "cultivation apparatus" or "apparatus") can be similar in form and/or function to the cultivation apparatus 100, 200, and/or 300 described above. For example, as described above with reference to the cultivation apparatus 100, the cultivation apparatus 400 can be used to seed species of target product that may be utilized in harvesting operations and/or carbon sequestration. The apparatus 400 can include a first member 420 (also referred to as a "buoy") configured to provide buoyancy to the various components of the apparatus 400, a second member 440 configured to accumulate or cultivate one or more species of target product 444, and a release component 460 (also referred to herein as "intermediate component") configured to separate, disconnect, release and/or decouple the first member 420 from the second member 440. In some embodiments, portions and/or aspects of the cultivation apparatus 400 can be similar to and/or substantially the same as portions and/or aspects of the cultivation apparatus 300 described above with reference to FIGS. 3A and/or 3B. Accordingly, such similar portions and/or aspects may not be described in further detail herein.

The first member 420 can be a flotation device of any suitable shape and/or size. In some embodiments, one or more portions of the first member 420 can be formed of a porous and/or hollow material configured to provide buoyancy. In some embodiments, the first member 420 can be any type of buoy such as a navigation buoy, a mooring buoy, a shot buoy, a spar buoy, and the like. In some embodiments, the first member 420 can contain air and/or other gases. In some embodiments, the air and/or gas can be pressurized. In some embodiments, one or more portions of the first member 420 can be formed of a relatively transparent material configured to allow transmission of visible light, facilitating absorption of light by the target product 444. In some embodiments, the first member 420 can be made of ocean compatible materials including but not limited to, polyglycolide, polylactide, polyhydroxybutyrate, chitosan, hyaluronic acid, poly(lactic-co-glycolic), poly (caprolactone), polyhydroxyalkanoate poly(lactic acid), poly(caprolactone), poly(orthoester), polycyanoacrylate, aluminum, carbon steel, stainless steel, galvanized steel, brass, and/or a combination thereof.

The second member 440 of the cultivation apparatus 400 can be any suitable shape, size, and/or configuration. The second member 440 can be any type of material suitable for attachment of target product 444. The second member 440 can be formed of a fibrous material or seeding line including a binder configured to facilitate attachment of the target product 444. The second member 440 can be mechanically coupled to the release component 460 by means of tie knots, thimble kits, hooks, and/or similar anchoring points (not shown in FIG. 4). As shown in FIG. 4, the second member 440 can include a single seeding line coupled to the release component 460. In other embodiments, the second member 440 can include a first seeding line coupled to the release component 460, and additional seeding lines (not shown) coupled to the first seeding line and/or to the release component 460 and configured to extend the amount of space available for attachment of target product.

As disclosed above, the second member 440 can be configured to accumulate or cultivate one or more second species of target product 444. In some embodiments, the second member 440 can include a binder configured to reinforce attachment of the 444 to the second member 440. In some embodiments, the second member 440 can include additives formulated to suppress contamination of target product 444. For example, in some embodiments, the second member 440 can include germanium dioxide ($GeO_2$). In some embodiments, the second member 440 can be co-winded, coiled, and/or intertwined with an iron or an iron-containing thread, filament, or string to provide negative buoyancy to the apparatus 400 and/or provide a source of iron (Fe) nutrient to the target product 444. In some embodiments, one or more portions of the second member 440 can be inoculated with a plurality of diazotroph microorganisms including single-celled archaea organisms, bacteria such as cyanobacteria, azotobacter, rhizobia, Frankia and the like (e.g., microbiota), capable of converting molecular nitrogen ($N_2$) from air into ammonia ($NH_3$) (e.g., fixing nitrogen). In some embodiments, one or more portions of the second member 440 can be sprayed with a fertilizer formulated to accelerate growth of the species of target product 444, and to improve the adherence of the species of target product 444 to the second member 440 by introducing rheology modifiers, agglutinants, and other additives including glycerol, molasses, high molecular weight polysaccharides, and other polymeric materials such as polyethylene oxide.

The release component 460 of the cultivation apparatus 400 can be any suitable shape, size, and/or configuration. For example, in some embodiments, the release component 460 can be a ring, shackle, swivel, joint or the like, configured to reversibly couple the first member 420 to the second member 440. In some embodiments, the release component 460 can be configured to join, interconnect, and/or couple the first member 420 and the second member 440 by means of tie knots, thimble kits, hooks, and/or similar anchor points. As described above, the anchor points can be made of ocean compatible materials including, for example, polyglycolide, polylactide, polyhydroxybutyrate, chitosan, hyaluronic acid, poly(lactic-co-glycolic), poly (caprolactone), polyhydroxyalkanoate poly(lactic acid), poly(caprolactone), poly(orthoester), polycyanoacrylate, aluminum, carbon steel, stainless steel, galvanized steel, brass and the like. The release component 460 can also be formed of an ocean compatible material configured to decompose after some minimum period of intended lifetime, separating, disconnecting, and/or decoupling the first member 420 from the second member 440, therefore causing the second member 440 and the attached target product to sink to the sea bottom. In some embodiments, the first member 420 can be configured to degrade and/or otherwise decompose on the surface of the water line W. In some embodiments, the first member 420 can also be allowed to degrade and sink to the sea bottom. In some embodiments, the first member 420 can be configured to be retrieved and re-used.

As described above, the cultivation apparatus 400 can be used to seed species of target product that may be utilized in harvesting operations and/or carbon sequestration. In some embodiments, the cultivation apparatus 400 can be first seeded with one or more species of target product gametophytes and/or sporophytes, and then deployed on oceans, lakes, rivers, and/or any other suitable body of water. The apparatus 400 can be configured to float near surface of the water line W to facilitate absorption of UV light, $O_2$ and/or nutrients associated with and/or facilitating target product growth. In some embodiments, the cultivation apparatus 400 can be configured to be accessed for target product harvesting purposes after a predetermined period of time has elapsed, or after a predetermined amount of growth of the selected species of target product has been achieved. In some embodiments, the release component 460 can be configured to degrade after a minimum period of intended lifetime and/or a minimum amount of target product has accumulated on the second member 440, decoupling the first member 420 from the second member 440, causing the first member 420 to float, and the second member 440 and the attached target product to sink to the sea bottom, effectively sequestering the carbon associated with the target product mass.

Figure 5A:
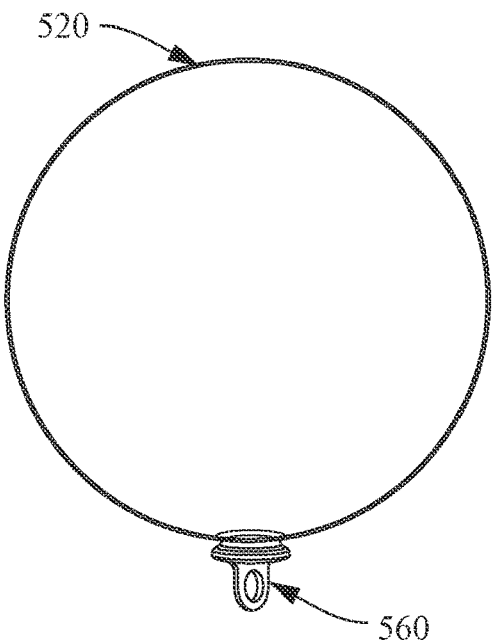
FIG. 5A shows a front view of a first member and a release component of a target product cultivation apparatus, according to an embodiment.
Figure 5B:
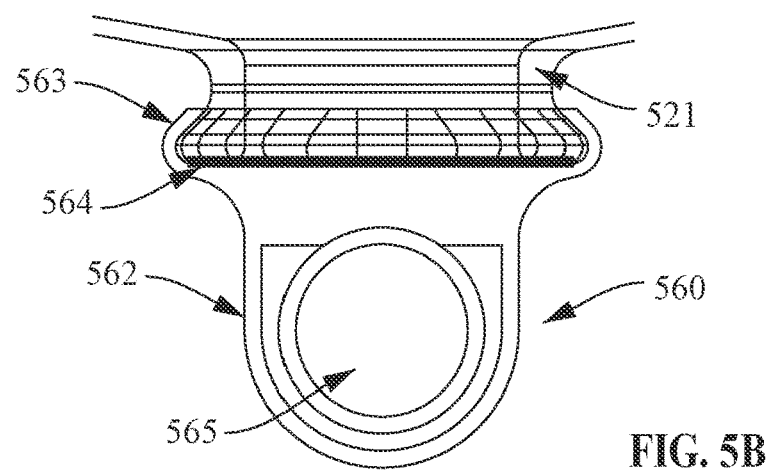
FIGS. 5B and 5C show a detailed front view and perspective view, respectively, of the release component of the target product cultivation apparatus shown in FIG. 5A.
Figure 5C:
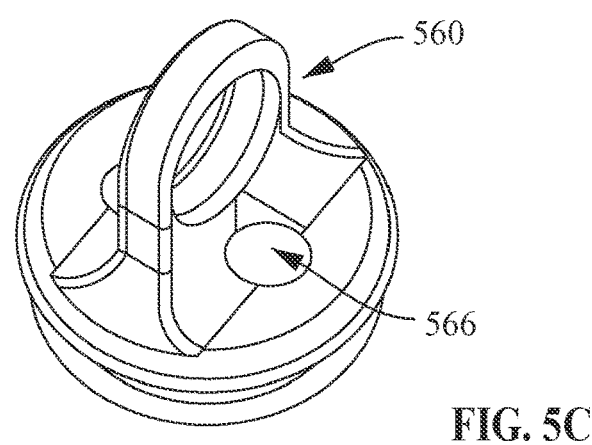

FIGS. 5A-5C illustrate a first member 520 and a release component 560 of a target product cultivation apparatus, according to an embodiment. The target product cultivation apparatus (also referred to herein as "cultivation apparatus" or "apparatus") can be similar in form and/or function to the cultivation apparatus 100, 200, 300, and/or 400 described above. For example, as described above with reference to the cultivation apparatus 100, the cultivation apparatus according to this embodiment can be used to seed species of target product that may be utilized in harvesting operations and/or carbon sequestration. In some embodiments, portions and/or aspects of the first member 520 and the release component 560 according to this embodiment, can be similar to and/or substantially the same as portions and/or aspects of the first member 420 and the release component 460 described above with reference to FIG. 4. Accordingly, such similar portions and/or aspects may not be described in further detail herein. As shown in FIG. 5A the first member 520 can be any type of buoy such as a navigation buoy, a mooring buoy, a shot buoy, a spar buoy, and the like, containing air and/or other gases, and configured to provide buoyancy to the various components of the apparatus 500.

FIG. 5B shows the release component 560 can be configured to be coupled to the first member 520 to maintain a gas tight seal that prevents air and/or other gases contained in the first member 520 to escape. In some embodiments, the release component 560 can include a housing 562 comprising a coupling chamber and/or portion 563, a layer of a degradable material 564, and a portion and/or section defining an aperture 565. The housing 562 can be made of any suitable material including, but not limited to glass, metal, metal alloys, and/or other ocean compatible materials. In some embodiments, the coupling chamber and/or portion 563 can include a threaded end portion that can be connected, matched and/or coupled to a similarly threaded end portion 521 of the first member 520. In some embodiments, the coupling chamber and/or portion 563 can include screws, bolts fasteners, nails, adhesives and the like configured to connect to and/or attach to the first member 520. In some embodiments, the coupling chamber and/or portion 563 of the release component 560 can include a quick connect adapter, a pressure fitting, a metal gasket face seal fitting or the like. Alternatively, in other embodiments the housing 562 can be shaped as a plug, stopper, cork, or the like, configured to be coupled to and seal the first member 520.

The layer of the degradable material 564 can be disposed inside and/or adjacent to the coupling chamber and/or portion 563. In some embodiments, the layer of the degradable material 564 can be shaped as a washer, a gasket, and/or any other geometry suitable fit the housing 562 and/or the coupling chamber and/or portion 563 of the release component 560. In some embodiments, the layer of the degradable material 564 can be shaped as a gasket configured to seal the gases contained inside the first member 520. In some embodiments, the layer of the degradable material 564 can be configured to degrade after some minimum period of intended lifetime, disrupting and/or breaking the seal between the first member 520 and the release component 560, allowing contained air and/or other gases to escape (or be released) from the first member 520 causing the cultivation apparatus 500 to sink. In some embodiments, for example as shown in FIG. 5C, the housing 562 can include one or more openings 566 that facilitate exposure of the layer of the degradable material 564 to sea water, triggering the degradation of the layer of the degradable material 564, leading to the sinking of the cultivation apparatus. In some embodiments, the layer of the degradable material 564 can be made of a material such as Zinc that degrades or decomposes at a predictable and reproducible rate, allowing air to escape the first member 520 and/or allowing water to permeate or infiltrate the first member 520 causing the apparatus to sink after a predetermined amount of time. In some embodiments, the layer of the degradable material 564 can include a first portion or coating made of a material such as Zinc that degrades or decomposes at a predictable and reproducible rate, and a second portion or inner core, that comprises an alkali metal such Sodium (Na), Potassium (K), Lithium (Li), Rubidium (Rb), Cesium (Cs) Francium (Fr) or a combination thereof, which can react vigorously and violently with water, mechanically disrupting and/or crushing the release component 560 to allow air to escape the first member 520 and/or water to permeate the first member 520 causing the cultivation apparatus to sink.

As described above, the housing 562 can also include a portion and/or section defining an aperture 565 that can be configured to anchor a second member (seeding lines not shown). In some embodiments the aperture 565 can be an eye bolt, a swivel link, a hoist ring or the like. In some embodiments, the second member 540 (e.g., seeding line) can be coupled to the release component 560 via the aperture 565 defined by the housing 562. In some embodiments, the aperture 565 of the housing 562 can be used to directly couple the second member 540 by means of tie knots, thimble kits, hooks and/or similar approaches, as described above with respect to the release component 160.

Figure 6A:
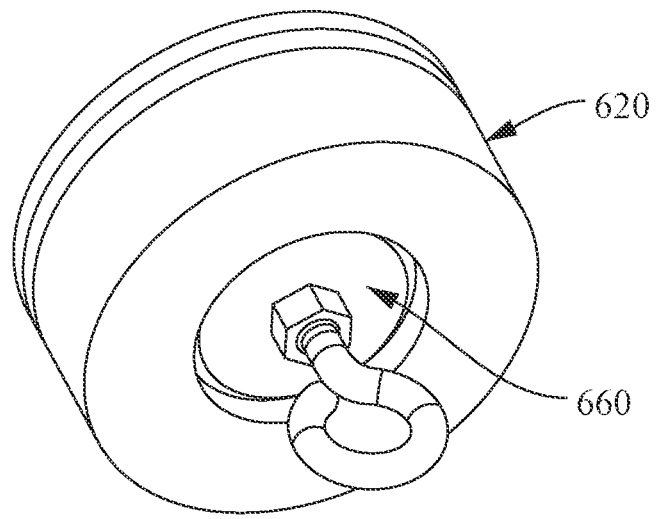
FIGS. 6A and 6B show a perspective view and a front view, respectively, of a first member and a coupling mechanism of a target product cultivation apparatus, according to an embodiment.
Figure 6B:
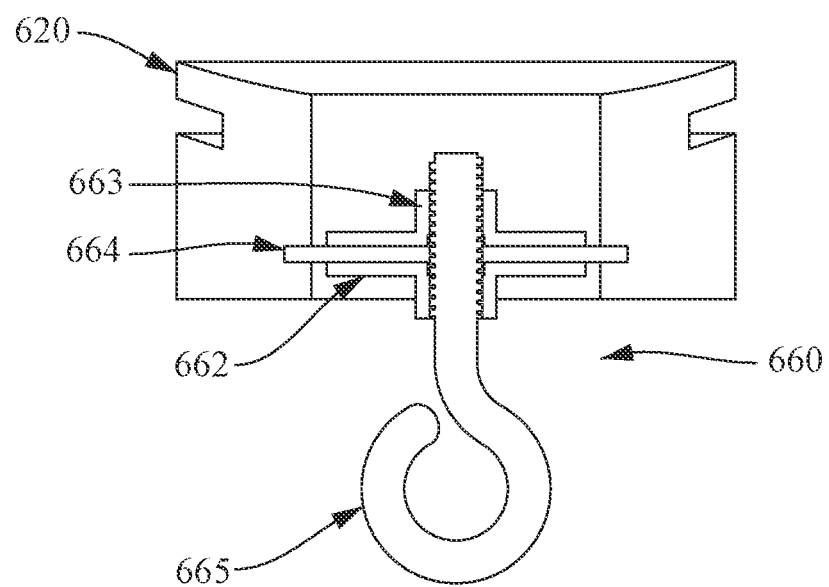

FIG. 6A-6B illustrate a first member 620 and a release component 660 of a target product cultivation apparatus, according to an embodiment. The target product cultivation apparatus (also referred to herein as "cultivation apparatus" or "apparatus") can be similar in form and/or function to the cultivation apparatus 100, 200, 300, and/or 400 described above. For example, as described above with reference to the cultivation apparatus 100, the cultivation apparatus according to this embodiment can be used to seed species of target product that may be utilized in harvesting operations and/or carbon sequestration. In some embodiments, portions and/or aspects of the first member 620 and the release component 660 according to this embodiment, can be similar to and/or substantially the same as portions and/or aspects of the first member 420 and the release component 460 described above with reference to FIG. 4. Accordingly, such similar portions and/or aspects may not be described in further detail herein.

FIG. 6A shows the first member 620 can be shaped as a disc and or cylinder comprising a hollow interior configured to provide buoyancy to the cultivation apparatus. In some embodiments, the first member 620 can be made of an ocean compatible material such as glass. In other embodiments, the first member 620 can be made of other ocean compatible materials including but not limited to, polyglycolide, polylactide, polyhydroxybutyrate, chitosan, hyaluronic acid, poly(lactic-co-glycolic), poly (caprolactone), polyhydroxyalkanoate poly(lactic acid), poly(caprolactone), poly(orthoester), polycyanoacrylate, aluminum, carbon steel, stainless steel, galvanized steel, brass, and/or a combination thereof.

FIG. 6B shows the release component 660 can include a housing 662 coupled to the lower portion or section of the first member 620. The housing 662 can be made of any suitable material including, but not limited to glass, metal, metal alloys, and/or other ocean compatible materials. In some embodiments, the housing 662 can be configured to seal the first member 620 preventing air and/or other gases contained in the first member 620 to escape and/or impeding water to permeate the first member 620 cause the cultivation apparatus to sink. As shown in FIG. 6B, the housing 662 can include a coupling portion 663, a layer of a degradable material 664, and a structure defining an aperture 665. The housing 662 can be coupled to the first member 620 via the layer of the degradable material 664. For example, as shown in FIG. 6B, the layer of the degradable material 664 can be shaped as a single disc disposed within the housing 662 (e.g., sandwiched between two washers and/or layers of the housing 662). Moreover, the edges and/or outer portions of the disc of the degradable material 664 can be supported and/or encased within a receding structure of the first member 620. As a result, the housing 662 can be suspended inside the first member 620 as the disc of the degradable material 664 at least partially seals the first member 620. Alternatively, in some embodiments, the housing 662 can be coupled to the first member 620 via screws, bolts fasteners, nails, adhesives and the like.

As described above, the layer of the degradable material 664 can be shaped as a washer, a gasket, and/or a disc configured to be coupled to the first member 620. In some embodiments, the disc of the degradable material 664 can be configured to degrade after some minimum period of intended lifetime, disrupting and/or breaking the seal between the first member 620 and the release component 660, allowing contained air and/or other gases to escape (or be released) from the first member 620 causing the cultivation apparatus to sink. In some embodiments, the disc of the degradable material 664 can be made of a material such as Zinc that degrades or decomposes at a predictable and reproducible rate, allowing air to escape the first member 620 and/or allowing water to permeate or infiltrate the first member 620 causing the apparatus to sink after a predetermined amount of time. In some embodiments, the disc of the degradable material 664 can include a first portion or coating made of a material such as Zinc that degrades or decomposes at a predictable and reproducible rate, and a second portion or inner core, that comprises an alkali metal such Sodium (Na), Potassium (K), Lithium (Li), Rubidium (Rb), Cesium (Cs) Francium (Fr) or a combination thereof, which can react vigorously and violently with water, mechanically disrupting and/or crushing the release component 660 to allow air to escape the first member 620 and/or water to permeate the first member 620 causing the apparatus to sink. Alternatively, in some embodiments, the release component 660 can include a first disc of a degradable material 664 coupled to and/or attached to the housing 662, and a second disc made having its edges and/or outer portions supported and/or encased within a receding structure of the first member 620. The first of the degradable material 664 coupled to the housing 662 can then be interlocked with the second disc to secure and/or seal the first member 620. As the first disc of the degradable material degrade, the seal of the first member 620 becomes compromised allow air to escape from the first member 620 and/or water to permeate the first member 620 causing the cultivation apparatus to sink.

As described above, the housing 662 of the release component 660 can also include a coupling portion 663 and a structure defining an aperture 665. As shown in FIG. 6B the coupling portion 6630 can include a thread configured to be coupled to a threaded eye bolt, hook, hoist ring and/or the like. In some embodiments the threaded eye bolt can include and or define the aperture 665. In some embodiments, the second member 640 (e.g., seeding line) can be coupled to the release component 660 via the aperture 665. In some embodiments, the aperture 665 of the housing 562 can be used to directly couple the second member 640 by means of tie knots, thimble kits, hooks and/or similar approaches, as described above with respect to the release component 160.

Figure 7:
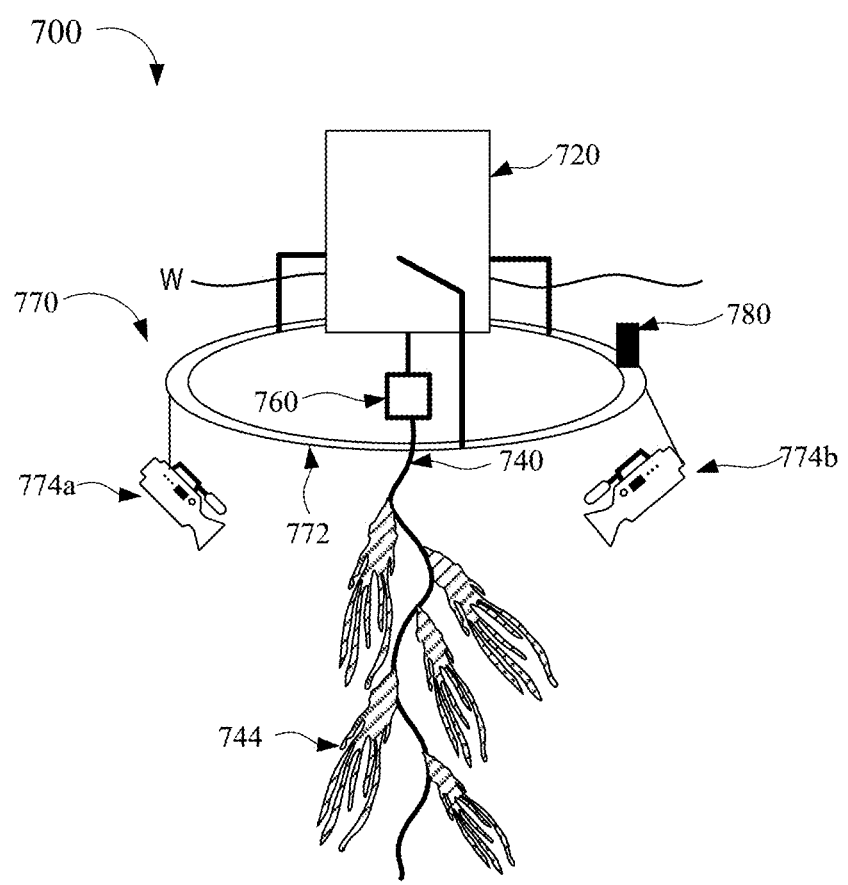
FIG. 7 is a schematic illustration of a sensing module of a target product cultivation apparatus, according to an embodiment.

FIG. 7 illustrates a target product cultivation apparatus 700 according to an embodiment. The target product, as described herein, includes and/or encompasses a wide variety of species including microalgae, macroalgae, plankton, marine bacteria, archaea filter feeders (such as oysters or clams), or crustaceans either for the purpose of bioremediation, eventual cultivation or for sequestering carbon dioxide. The target product cultivation apparatus 700 (also referred to herein as "cultivation apparatus" or "apparatus") can be similar in form and/or function to the cultivation apparatus 100, 200, 300, and/or 400 described above. For example, as described above with reference to the cultivation apparatus 100, the cultivation apparatus 700 can be used to seed species of target product that may be utilized in harvesting operations and/or carbon sequestration. The apparatus 700 can include a first member 720 (also referred to as a "buoy") configured to provide buoyancy to the various components of the apparatus 700, a second member 720 configured to receive one or more species of target product 744, and optionally a release component 760 configured to separate, disconnect, release and/or decouple the first member 720 from the second member 740. Additionally, the apparatus 700 includes a sensing module 770 and a communications module 780. The sensing module 770 can be coupled to, or associated with, the cultivation apparatus 700 and configured to sense, detect, measure, and/or quantify one or more characteristics and/or images relevant to species of target product disposed on the cultivation apparatus 700.

In some embodiments, the sensing module 770 can be mechanically coupled to the cultivation apparatus 700 (e.g., to the first member 720). In some embodiments, the sensing module 770 can be optically coupled to the cultivation apparatus 700. In some embodiments, the sensing module 770 can be electronically coupled to the cultivation apparatus 700. The communications module 780 can be electrically and mechanically coupled to the sensing module 770 and/or to the cultivation apparatus 700, and can be configured to (1) read the one or more characteristics and/or images relevant to the target product, (2) transmit signals representative of said target product characteristics and/or images to one or more external devices, and/or (3) receive from one or more external devices signals operable to control the sensing module 770. In some embodiments, portions and/or aspects of the cultivation apparatus 700 can be similar to and/or substantially the same as portions and/or aspects of the cultivation apparatus 400 described above with reference to FIG. 4. Accordingly, such similar portions and/or aspects may not be described in further detail herein.

The first member 720 can be a flotation device of any suitable shape and/or size. In some embodiments, one or more portions of the first member 720 can be formed of a porous and/or hollow material configured to provide buoyancy. In some embodiments, the first member 720 can be any type of buoy such as a navigation buoy, a mooring buoy, a shot buoy, a spar buoy, and the like. In some embodiments, the first member 720 can contain air and/or other gases.

The second member 740 of the cultivation apparatus 700 can be any suitable shape, size, and/or configuration. The second member 740 can be any type of material suitable for attachment of target product 744. The second member 740 can be formed of a fibrous material or seeding line including a binder configured to facilitate attachment of the target product 744. The second member 740 can be mechanically coupled to the release component 770 by means of tie knots, thimble kits, hooks, and/or similar anchoring points (not shown in FIG. 7).

The second member 740 can be configured to receive one or more second species of target product 744. In some embodiments, the second member 740 can include a binder configured to reinforce attachment of the target product 744 to the second member 740. In some embodiments, the second member 740 can include additives formulated to suppress contamination of target product 744. For example, in some embodiments, the second member 740 can include germanium dioxide ($GeO_2$). In some embodiments, the second member 740 can be co-winded, coiled, and/or intertwined with an iron or an iron-containing thread, filament, or string to provide negative buoyancy to the apparatus 700 and/or provide a source of iron (Fe) nutrient to the target product 744. In some embodiments, one or more portions of the second member 740 can be inoculated with a plurality of diazotroph microorganisms including single-celled archaea organisms, bacteria such as cyanobacteria, azotobacter, rhizobia, Frankia and the like (e.g., microbiota), capable of converting molecular nitrogen ($N_2$) from air into ammonia ($NH_3$) (e.g., fixing nitrogen). In some embodiments, one or more portions of the second member 740 can be sprayed with a fertilizer formulated to accelerate growth of the species of target product 744, and to improve the adherence of the species of target product 744 to the second member 740 by introducing rheology modifiers, agglutinants, and other additives including glycerol, molasses, high molecular weight polysaccharides, and other polymeric materials such as polyethylene oxide.

The release component 760 can be any suitable shape, size, and/or configuration. For example, in some embodiments, the release component 760 can be a ring, shackle, swivel, joint or the like, configured to reversibly couple the first member 720 to the second member 740. In some embodiments, the release component 760 can be configured to join, interconnect, and/or couple the first member 720 and the second member 740 by means of tie knots, thimble kits, hooks, and/or similar anchor points. The release component 760 can also be formed of an ocean compatible material configured to decompose after some minimum period of intended lifetime, separating, disconnecting, and/or decoupling the first member 720 from the second member 740, therefore causing the second member 740 and the attached target product to sink to the sea bottom.

The sensing module 770 can include a plurality of sensors configured to sense, detect, measure, and/or quantify one or more characteristics and/or images relevant to the species of target product 744 disposed on the cultivation apparatus 700. In some embodiments, the sensing module 770 can include one or more sensors configured to sense, detect, and/or measure water temperature, irradiance, dissolved oxygen concentration, concentration of nutrients, concentration of dissolved carbon, salinity, and/or other characteristics related to target product growth. The plant size, plant density, water temperature, irradiance, dissolved oxygen concentration, concentration of nutrients, concentration of dissolved carbon, salinity and/or other characteristics related to target product growth can be sensed and/or detected by the one or more sensors. In some embodiments, data associated with an output of the sensing module 770 sensor(s) can be read by the communications module 780 and be transmitted to an external device. The transmitted data can then be analyzed (e.g., by a control system, an analysis unit, and/or other compute device) to determine target product growth, quantify mass production, and/or mass yield. In other words, data output by the one or more sensors of the sensing module 770 can be analyzed to determine target product growth, mass production, carbon capture and/or sequestration rates, quantities, or capacities, and/or the like.

In some embodiments, the sensing module 770 can include pressure-release depth sensors configured to measure, and/or record the sinking rate of the apparatus 700 as a function of time after the apparatus 700 is seeded with target product 744, and deployed on oceans, lakes, rivers, and/or any other suitable body of water. The pressure-release depth sensors can be configured to measure the sinking rate of the apparatus 700, decouple from the apparatus 700 once the apparatus 700 reaches a predetermined depth threshold, emit (via the communications module 780) the sinking rate information recorded via satellite, and return to the surface. In some instances, the sinking rate of the apparatus 700 can be used to quantify the mass and related carbon captured and/or sequestered. In some instances, the pressure-release depth sensors of the sensing module 770 can be used to determine whether the apparatus 700 has sunk below a predetermined depth or threshold associated with and/or suitable for the permanent sequestration of carbon. In some embodiments, the predetermined depth or threshold associated with and/or suitable for the permanent sequestration of carbon can be greater than about 500 meters, about 600 meters, about 700 meters, about 800 meters, about 900 meters, about 1,000 meters, about 1,000 meters, about 1,100 meters, about 1,200 meters, about 1,300 meters, about 1,400 meters, about 1,500 meters, about 1,600 meters, about 1,700 meters, about 1,800 meters, about 1,900 meters, or about 2,000 meters from the surface.

In some embodiments, the sensing module 770 can include underwater cameras or other imaging technologies configured to image, record, and/or monitor target product growth or accumulation in number, density, spatial dimensions and extent or rates of change thereof. For example, in some embodiments the sensing module 770 can include a stereoscopic camera system equipped with two or more lenses comprising separate image sensors to simulate human binocular vision and thus facilitate obtaining images with perception of depth.

In some embodiments, the stereoscopic camera system can be equipped with a rectilinear lenses, fisheye lenses, and/or anamorphic lenses configured to produce detailed images of the target product growing on the cultivation apparatus 700. In some embodiments, the stereoscopic camera system can be configured to perform multiple image post processing steps. For example, in some embodiments the stereoscopic camera system can include a post processing step to analyze the images generated by the lenses and identify and/or correct distortions using algorithms that estimate distortion parameters and camera matrix through the use of, for example, a Lavenberg-Marquardt solver. In some embodiments, the stereoscopic camera system can include multiple post processing steps such as color correction, brightness/contrast, sharpness, backscatter removal, cropping and the like.

In some embodiments, the sensing module 770 can also include cameras equipped with Photosynthetically Active Radiation (PAR) sensors configured to measure photosynthetic light levels in air and water in the 400 to 700 nm range. The PAR sensors can be configured to measure photosynthetic photon flux density (PPFD) or the power of electromagnetic radiation in the visible light spectral range in micromoles of photons per square meter per second. The data captured by the PAR sensors can be used to estimate, determine, and/or quantify the intensity of solar light that is available to the target product disposed on the apparatus 700 for photosynthesis, and thus estimate and/or infer the relative health of the target product and/or the rate of growth of target product as well as other marine organisms.

The images recorded by the cameras of the sensing module 770 can be used to quantify the mass accumulated on the cultivation apparatus 700, as well as to estimate changes in the mass (e.g., rate of mass accumulation), and provide insights that facilitate evaluating the relative the health of the target product. In some embodiments, the images recorded by the sensing module 770 can be transmitted by the communication module 780 to an external device for analysis. In some instances, the images recorded by the sensing module 770 can be analyzed manually (e.g., manual annotation by a user) to determine the amount of mass on the apparatus 700, the rate of growth of target product, and/or the amount of $CO_2$ effectively captured by the mass accumulated on the apparatus 700. For example, in some embodiments, the sensing module 770 can initiate image capture (e.g., record images and/or videos of the target product disposed on the cultivation apparatus 700 at different points in time), post process those images (e.g., adjust color, brightness/contrast, sharpness, backscatter removal, removal of noise, cropping and the like) and transmit via the communications module 780 the images and/or videos for data extraction or annotation by a user, and statistical analysis of the extracted data. In other instances, the images recorded by the sensing module 770 can be analyzed or annotated using computer vision approaches.

In some embodiments, software onboard the sensing module 770 or the communication model 780 may employ strategies to minimize the usage of costly and power consuming satellite telemetry. These strategies may involve data compression. They may involve data subset selection. They may involve the use of machine learning models to subsample or summarize the data to be transmitted. In some embodiments, the apparatus may utilize two-way telemetric communication to receive user instructions to dynamically select data to be transmitted, or to switch data usage or data modelling modalities.

As shown in FIG. 7, the sensing module 770 includes a frame 772 configured to provide mechanical support to the one or more cameras 774a, 774b (collectively referred to as cameras 774) of the sensing module 770, and/or the communications module 780. The frame 772 can be any suitable shape and/or size. The frame 772 can have sufficient mechanical strength to withstand tidal waves and ocean currents to secure the stability and longevity of the components of the sensing module 770 and the communications module 780. In some embodiments, the frame 772 can be a rigid structure formed from any number of struts (e.g., rod-shaped elements). In other embodiments, the frame 772 can be formed from any number of plates and/or panels. The plates of the frame 772 can define a closed-loop shape that can be used to house, support, and/or attach various components of the sensing module 770 (e.g., the cameras 774 and other hardware required). For example, as shown in FIG. 7, the frame 772 can be an assembly of plates forming a support structure with a substantially oval or circular shape. The plates can include one or more tabs, braces, and/or brackets disposed along the length of the plate, which can function as mounting points to couple other components or plates to the frame 772. In that way, the frame 772 can be modular. The frame 772 can be coupled to the first member 720 using various coupling mechanisms such as straps, brackets, hooks, and the like. The plates forming the frame 772 can be made of various metals, plastics, and composites including, but not limited to aluminum, steel, stainless steel, polyethylene, polyvinyl chloride, polycarbonates, poly(methyl methacrylate), fiberglass, carbon fiber, and/or the like. A coating can also be applied to improve the corrosion resistance of the frame 772 to salt water and/or fresh water, as further described herein.

The cameras 774 of the sensing module 770 can be coupled to the frame 772 using various coupling mechanisms including, but not limited to screws, bolt fasteners, welding, brazing, adhesives, or any combination thereof. In some embodiments, the cameras 774 can be mounted at different orientations in order to facilitate the capture of images of the target product disposed on the cultivation apparatus 700. In some embodiments, the cameras 774 can be mounted at a fixed angled. In other embodiments, the cameras 774 can be mounted on the frame 772 such that a motorized accessory (not shown) can change the orientation of the camera 774 (e.g., adjusted the angle to which the lenses point).

In some embodiments, the sensing module 770 can include cameras 774 equipped with an anti-fouling system configured to detect, prevent and/or minimize the degradation of the various components of the sensing module 770 due to accumulation and/or growth of marine microorganisms, plants, algae or small animals, as well as the micro-biologically influenced corrosion (MIC) generated by metabolites of such marine microorganism. In some embodiments, the anti-fouling system can include a detection light source such as a Light-Emitting-Diode (LED) lamp configured to direct a beam of light in the ultraviolet (250-280 nm) range to the lenses and/or other components of the underwater cameras and induce the emission of fluorescence by the microorganisms, plants, algae or small animals fluorophores. The detection light source can be used to trigger a fluorescence response of marine microorganisms deposited on the sensing module 770, which can be detected by one or more cameras equipped with suitable detectors such as a charge-coupled device (CCD), an electron-multiplying charge coupled device (EM-CCD), and/or a complementary metal oxide semiconductor (CMOS) detector. The cameras 774 can quantify the intensity of a fluorescence signal that can be used to evaluate the accumulation of marine microorganisms on the sensing module 770. In some instances, the detection light source can be used to remove at least a fraction of the marine microorganisms accumulated on the sensing system 770 due to the microorganism's low tolerance to the intense UV radiation generated by the detection light source.

In some embodiments, the anti-fouling system can include one or more chemical bactericides or anti-fouling biocides that provide a toxic environment for marine microorganisms. In some embodiments, the components of the sensing module 770 including lenses, camera chassis, and peripheral hardware can be coated with a protective layer including one or more anti-fouling biocides including, but not limited to 2-methylthio-4-tertiary-butylamino-6-cyclopropylamino-s-triazine (Irgarol 1051), 1-(3,4-dichlorophenyl)-3,3-dimethylurea (diuron), 4,5-dichloro-2-n-octyl-4-isothiazolin-3-one (DCOIT), N-dichlorofluoromethylthio-N',N'-dimethyl-N-phenylsulphamide (dichlofluanid), N-dichlorofluoromethylthio-N',N'-dimethyl-N-p-tolylsulfamide (tolylfluanid), 2,4,5,6-terachloro iso phthalo nitrile (chlorothalonil), Bis(1hydroxy-2(1H)-pyridethionato-O,S)-T-4 zinc (zinc pyrithione), Bis(1hydroxy-2(1H)-pyridethionato-O,S)-T-4 copper (copper pyrithione), 2-(thiocyanomethyl thio)benzthiazole (TCMTB), 2,3,5,6-tetrachloro-4-(methyl sulphonyl) pyridine (TCMS pyridine), pyridine-triphenylborane (TPBP), cuprous thiocyanate, arsenic trioxide, zineb, folpet, thiram, oxytetracycline hydrochloride, ziram, maneb, and/or a combination thereof.

The communications module 780 can be coupled to, or associated with, the sensing module 770. In some embodiments, the communications module 780 can be mechanically coupled to the cultivation apparatus 700 (e.g., to the first member 720) and/or the sensing module 770. In some embodiments, the communications module 780 can be mechanically coupled to the first member 720 of the cultivation apparatus 700. In other embodiments, the communications module 780 can be mechanically coupled to the second member 740 of the cultivation apparatus. In some embodiments, the communications module 780 can coupled to a dedicated flotation device such as a foam, a secondary buoy, and or the like. In some embodiments, the flotation device can also serve as a support structure to other components of the communications module including, but not limited to a satellite antenna, or a power source such as a battery or a solar panel. In some embodiments, the communications module 780 can be electronically coupled (i.e., wired or wireless) to the cultivation apparatus 700 and/or the sensing module 770. In some embodiments, the communications module 780 can be powered by one or more solar panels. For example, in some embodiments, the communications module 780 can be powered by a 20W solar panel configured to provide electric power to the various components of the communication module 780. Alternatively, in some embodiments the communications module 780 can have any suitable power source and/or energy storage device. In some embodiments, the power source of the communications module 780 can include one or more rechargeable batteries. In some embodiments, the communications module can include one or more ports that enable connection between an external power source and the communication module 780 as an auxiliary and/or back up power source. In some embodiments, the communications module 780 can be configured to (1) read the one or more characteristics relevant to the target product, (2) transmit signals representative of the cultivation apparatus 700 and/or the target product characteristics to one or more external devices, and/or (3) receive from one or more external devices signals operable to control the sensing module 770 of the cultivation apparatus 700. In some embodiments the apparatus 700 can include one or more tracking devices configured to produce, and/or transmit signals associated with the apparatus 700 relative position upon being seeded with target product gametophytes and/or sporophytes and being deployed on oceans, lakes, rivers, and/or any other suitable body of water. The position and/or trajectory of the apparatus 700 can be transmitted, recorded and/or stored (e.g., by the control system, an analysis unit, and/or other compute device) and can be further employed by remote sensing devices to determine and/or quantify (directly or indirectly) target product growth, mass production, and/or carbon capture. For example, in some instances, the apparatus 700 can include a Global Positioning System (GPS) tracking device configured to determine, record, and/or transmit the apparatus 700 geographic location. In other instances, the apparatus 700 can include appropriately angled radar reflectors to be tracked remotely by satellite-based instruments. In other instances, the apparatus 700 can include Radio-Frequency Identification (RFID) devices configured to determine, record, and/or transmit the apparatus 700 geographic location. Alternatively, in some embodiments, the communications module 780 can include a satellite antenna. The geographic location of the apparatus 700 can be further used by remote sensing techniques to determine target product growth, and quantify mass production, mass yield, and carbon capture. For example, in some instances, remote sensing techniques such as near-infrared aerial photography, SPOT multispectral imagery, aerial digital multispectral imaging systems (DMSC) calibrated with ground truthing, and/or airborne hyperspectral systems can be used to quantify mass production, mass yield, and carbon capture. In some instances, trajectory data can be used to determine, calculate, and/or infer mass growth by comparing surface or subsurface conditions (e.g., wind, current, etc.) with subsurface mass motion and/or the like.

As described above, the cultivation apparatus 700 can be used to seed species of target product that may be utilized in harvesting operations and/or carbon sequestration. In some embodiments, the cultivation apparatus 700 can be first seeded with one or more species of target product, and then deployed on oceans, lakes, rivers, and/or any other suitable body of water. The apparatus 700 can be configured to float near surface to facilitate absorption of UV light, $O_2$ and/or nutrients associated with and/or facilitating target product growth. In some embodiments, the cultivation apparatus 700 can be configured to be accessed for target product harvesting purposes after a predetermined period of time has elapsed, or after a predetermined amount of growth of the selected species of target product has been achieved. In some embodiments, the release component 760 can be configured to degrade after a minimum period of intended lifetime and/or a minimum amount of target product has accumulated on the second member 740, decoupling the first member 720 from the second member 740, causing the first member 720 to float, and the second member 740 and the attached target product to sink to the sea bottom, effectively sequestering the carbon associated with the target product mass.

Figure 8:
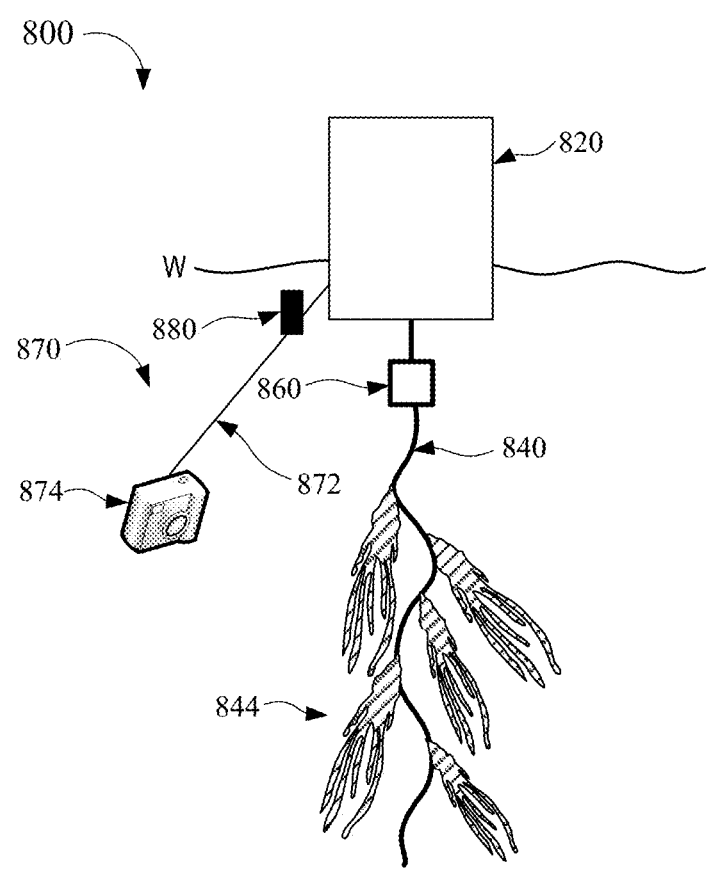
FIG. 8 is a schematic illustration of a sensing module of a target product cultivation apparatus, according to an embodiment.

FIG. 8 illustrates a target product cultivation apparatus 800 according to an embodiment. The target product, as described herein, includes and/or encompasses a wide variety of species including micro or macro algae, plankton, marine bacteria, archaea filter feeders (such as oysters or clams), or crustaceans either for the purpose of bioremediation, eventual cultivation or for sequestering carbon dioxide. The target product cultivation apparatus 800 (also referred to herein as "cultivation apparatus" or "apparatus") can be similar in form and/or function to the cultivation apparatus 100, 200, 300, 400 and/or 700 described above. For example, as described above with reference to the cultivation apparatus 100, the cultivation apparatus 800 can be used to seed species of target product that may be utilized in harvesting operations and/or carbon sequestration. The apparatus 800 can include a first member 820 (also referred to as a "buoy") configured to provide buoyancy to the various components of the apparatus 800, a second member 820 configured to accumulate or cultivate one or more species of target product 844, and optionally a release component 860 configured to separate, disconnect, release and/or decouple the first member 820 from the second member 840. Additionally, the apparatus 800 includes a sensing module 870 and a communications module 880. The sensing module 870 can be coupled to, or associated with, the cultivation apparatus 800 and configured to sense, detect, measure, and/or quantify one or more characteristics and/or images relevant to species of target product disposed on the cultivation apparatus 800. In some embodiments, the sensing module 870 can be mechanically coupled to the cultivation apparatus 800 (e.g., to the first member 820). In some embodiments, the sensing module 870 can be optically coupled to the cultivation apparatus 800. In some embodiments, the sensing module 870 can be electronically coupled to the cultivation apparatus 800. The communications module 880 can be electrically and mechanically coupled to the sensing module 870 and/or to the cultivation apparatus 800, and can be configured to (1) read the one or more characteristics and/or images relevant to the target product, (2) transmit signals representative of said target product characteristics and/or images to one or more external devices, and/or (3) receive from one or more external devices signals operable to control the sensing module 870. In some embodiments, portions and/or aspects of the cultivation apparatus 800 can be similar to and/or substantially the same as portions and/or aspects of the cultivation apparatus 700 described above with reference to FIG. 7. Accordingly, such similar portions and/or aspects may not be described in further detail herein.

The first member 820 can be a flotation device of any suitable shape and/or size. In some embodiments, one or more portions of the first member 820 can be formed of a porous and/or hollow material configured to provide buoyancy. In some embodiments, the first member 820 can be any type of buoy such as a navigation buoy, a mooring buoy, a shot buoy, a spar buoy, and the like. In some embodiments, the first member 820 can contain air and/or other gases.

The second member 840 of the cultivation apparatus 800 can be any suitable shape, size, and/or configuration. The second member 840 can be any type of material suitable for attachment of target product 844. The second member 840 can be formed of a fibrous material or seeding line including a binder configured to facilitate attachment of the target product 844. The second member 840 can be mechanically coupled to the release component 860 by means of tie knots, thimble kits, hooks, and/or similar anchoring points (not shown in FIG. 8).

The second member 840 can be configured to accumulate or cultivate one or more second species of target product 844. In some embodiments, the second member 840 can include a binder configured to reinforce attachment of the 844 to the second member 840. In some embodiments, the second member 840 can include additives formulated to suppress contamination of target product 844.

The release component 860 of the cultivation apparatus 800 can be any suitable shape, size, and/or configuration. For example, in some embodiments, the release component 860 can be a ring, shackle, swivel, joint or the like, configured to reversibly couple the first member 820 to the second member 840. In some embodiments, the release component 860 can be configured to join, interconnect, and/or couple the first member 820 and the second member 840 by means of tie knots, thimble kits, hooks, and/or similar anchor points. The release component 860 can also be formed of an ocean compatible material configured to decompose after some minimum period of intended lifetime, separating, disconnecting, and/or decoupling the first member 820 from the second member 840, therefore causing the second member 840 and the attached target product to sink to the sea bottom.

The sensing module 880 can include a plurality of sensors configured to sense, detect, measure, and/or quantify one or more characteristics and/or images relevant to the species of target product 844 disposed on the cultivation apparatus 800. In some embodiments, the sensing module 870 can include one or more sensors configured to sense, detect, and/or measure water temperature, irradiance, dissolved oxygen concentration, concentration of nutrients, concentration of dissolved carbon, salinity, and/or other characteristics related to target product growth.

In some embodiments, the sensing module 870 can include underwater cameras or other imaging technologies configured to image, record, and/or monitor number of plants and/or heterokonts (e.g., kelp, target product, etc.), number of fronds per heterokont, frond dimensions, and/or density associated to target product growth. For example, in some embodiments the sensing module 870 can include a stereoscopic camera system equipped with two or more lenses comprising separate image sensors to simulate human binocular vision and thus facilitate obtaining images with perception of depth.

FIG. 8 shows the sensing module 870 can include a rod 872 (also referred to herein as "beam" or "stick") configured to provide mechanical support to the one or more cameras 874 of the sensing module 870, and/or the communications module 880. The rod 872 can have sufficient mechanical strength to withstand tidal waves and ocean currents to secure the stability and longevity of the components of the sensing module 870 and the communications module 880. The rod 872 can be coupled to the first member 820 using various coupling mechanisms such as straps, brackets, hooks, and the like. The cameras of the sensing module 870 can be coupled to the rod 872 using various coupling mechanisms including, but not limited to screws, bolt fasteners, welding, brazing, adhesives, or any combination thereof. In some embodiments, the camera 874 can be mounted at different orientations in order to facilitate the capture of images of the target product disposed on the cultivation apparatus 800. In some embodiments, the rod 872 can have a telescoping movement that allows the cameras to change the field of view, and other imaging conditions.

In some embodiments, the sensing module 870 can include cameras 874 equipped with an anti-fouling system configured to detect, prevent and/or minimize the degradation of the various components of the sensing module 870 due to accumulation and/or growth of marine microorganisms, plants, algae or small animals, as well as the microbiologically influenced corrosion (MIC) generated by metabolites of such marine microorganism, as further described with reference to the apparatus 800.

The communications module 880 can be coupled, or associated with, to the sensing module 870. In some embodiments, the communications module 880 can be mechanically coupled to the cultivation apparatus 800 (e.g., to the first member 820) and/or the sensing module 870. In some embodiments, the communications module 880 can be mechanically coupled to the first member 820 of the cultivation apparatus 800. In other embodiments, the communications module 880 can be mechanically coupled to the second member 840 of the cultivation apparatus. In some embodiments, the communications module 880 can coupled to a dedicated flotation device such as a foam, a secondary buoy, and or the like. In some embodiments, the flotation device can also serve as a support structure to other components of the communications module 880 including, but not limited to a satellite antenna, or a power source such as a battery or a solar panel. In some embodiments, the communications module 880 can be electronically coupled (i.e., wired or wireless) to the cultivation apparatus 800 and/or the sensing module 870. In some embodiments, the communications module 880 can be powered by one or more solar panels. For example, in some embodiments, the communications module 880 can be powered by a 20W solar panel configured to provide electric power to the various components of the communication module 880. Alternatively, in some embodiments the communications module 880 can have any suitable power source and/or energy storage device. In some embodiments, the power source of the communications module 880 can include one or more rechargeable batteries. In some embodiments, the communications module 880 can include one or more ports that enable connection between an external power source and the communication module 880 as an auxiliary and/or back up power source. In some embodiments, the communications module 880 can be configured to (1) read the one or more characteristics relevant to the target product, (2) transmit signals representative of the cultivation apparatus 800 and/or the target product characteristics to one or more external devices, and/or (3) receive from one or more external devices signals operable to control the sensing module 870. In some embodiments the apparatus 800 can include one or more tracking devices configured to produce, and/or transmit signals associated with the apparatus 800 relative position upon being seeded with target product and being deployed on oceans, lakes, rivers, and/or any other suitable body of water. The position and/or trajectory of the apparatus 800 can be transmitted, recorded and/or stored (e.g., by the control system, an analysis unit, and/or other compute device) and can be further employed by remote sensing devices to determine and/or quantify (directly or indirectly) target product growth, mass production, and/or carbon capture.

As described above, the cultivation apparatus 800 can be used to seed species of target product that may be utilized in harvesting operations and/or carbon sequestration. In some embodiments, the cultivation apparatus 800 can be first seeded with one or more species of target product, and then deployed on oceans, lakes, rivers, and/or any other suitable body of water. The apparatus 800 can be configured to float near surface to facilitate absorption of UV light, $O_2$ and/or nutrients associated with and/or facilitating target product growth. In some embodiments, the cultivation apparatus 800 can be configured to be accessed for target product harvesting purposes after a predetermined period of time has elapsed, or after a predetermined amount of growth of the selected species of target product has been achieved. In some embodiments, the release component 860 can be configured to degrade after a minimum period of intended lifetime and/or a minimum amount of target product has accumulated on the second member 840, decoupling the first member 820 from the second member 840, causing the first member 820 to float, and the second member 840 and the attached target product to sink to the sea bottom, effectively sequestering the carbon associated with the target product mass.

Figure 9:
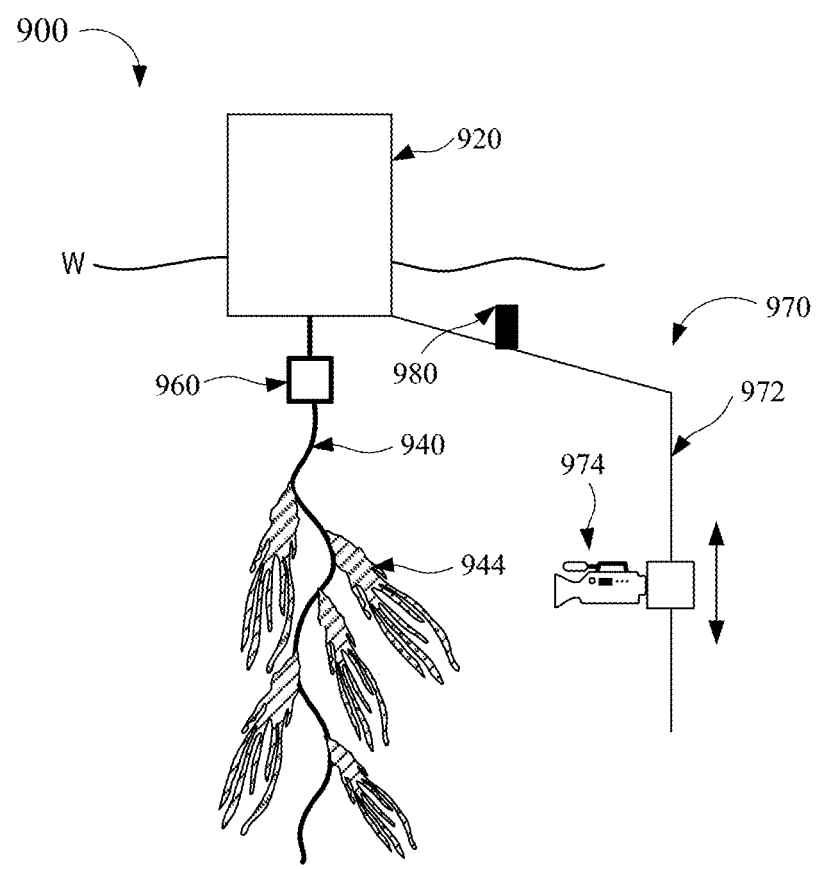
FIG. 9 is a schematic illustration of a sensing module of a target product cultivation apparatus, according to an embodiment.

FIG. 9 illustrates a target product cultivation apparatus 900 according to an embodiment. The target product, as described herein, includes and/or encompasses a wide variety of species including microalgae, macroalgae, plankton, marine bacteria, archaea filter feeders (such as oysters or clams), or crustaceans either for the purpose of bioremediation, eventual cultivation or for sequestering carbon dioxide. The target product cultivation apparatus 900 (also referred to herein as "cultivation apparatus" or "apparatus") can be similar in form and/or function to the cultivation apparatus 100, 200, 300, 400, 700, and/or 800 described above. For example, as described above with reference to the cultivation apparatus 100, the cultivation apparatus 900 can be used to seed species of target product that may be utilized in harvesting operations and/or carbon sequestration. The apparatus 900 can include a first member 920 (also referred to as a "buoy") configured to provide buoyancy to the various components of the apparatus 900, a second member 920 configured to accumulate or cultivate one or more species of target product 944, and optionally a release component 960 configured to separate, disconnect, release and/or decouple the first member 920 from the second member 940. Additionally, the apparatus 900 includes a sensing module 970 and a communications module 980. The sensing module 970 can be coupled to, or associated with, the cultivation apparatus 900 and configured to sense, detect, measure, and/or quantify one or more characteristics and/or images relevant to species of target product disposed on the cultivation apparatus 800. In some embodiments, the sensing module 970 can be mechanically coupled to the cultivation apparatus 900 (e.g., to the first member 920). In some embodiments, the sensing module 970 can be optically coupled to the cultivation apparatus 900. In some embodiments, the sensing module 970 can be electronically coupled to the cultivation apparatus 900. The communications module 980 can be electrically and mechanically coupled to the sensing module 970 and/or to the cultivation apparatus 900, and can be configured to (1) read the one or more characteristics and/or images relevant to the target product, (2) transmit signals representative of said target product characteristics and/or images to one or more external devices, and/or (3) receive from one or more external devices signals operable to control the sensing module 870 of the cultivation apparatus 900. In some embodiments, portions and/or aspects of the cultivation apparatus 900 can be similar to and/or substantially the same as portions and/or aspects of the cultivation apparatus 700 and 800 described above with reference to FIGS. 7 and 8. Accordingly, such similar portions and/or aspects may not be described in further detail herein.

The first member 920 can be a flotation device of any suitable shape and/or size. In some embodiments, one or more portions of the first member 920 can be formed of a porous and/or hollow material configured to provide buoyancy. In some embodiments, the first member 920 can be any type of buoy such as a navigation buoy, a mooring buoy, a shot buoy, a spar buoy, and the like. In some embodiments, the first member 920 can contain air and/or other gases.

The second member 940 of the cultivation apparatus 900 can be any suitable shape, size, and/or configuration. The second member 940 can be any type of material suitable for attachment of target product 944. The second member 940 can be formed of a fibrous material or seeding line including a binder configured to facilitate attachment of the target product 944. The second member 940 can be mechanically coupled to the release component 960 by means of tie knots, thimble kits, hooks, and/or similar anchoring points (not shown in FIG. 8).

The second member 940 can be configured to accumulate or cultivate one or more second species of target product 944. In some embodiments, the second member 940 can include a binder configured to reinforce attachment of the 944 to the second member 940. In some embodiments, the second member 940 can include additives formulated to suppress contamination of target product 944.

The release component 960 of the cultivation apparatus 900 can be any suitable shape, size, and/or configuration. For example, in some embodiments, the release component 960 can be a ring, shackle, swivel, joint or the like, configured to reversibly couple the first member 920 to the second member 940. In some embodiments, the release component 960 can be configured to join, interconnect, and/or couple the first member 920 and the second member 940 by means of tie knots, thimble kits, hooks, and/or similar anchor points. The release component 960 can also be formed of an ocean compatible material configured to decompose after some minimum period of intended lifetime, separating, disconnecting, and/or decoupling the first member 920 from the second member 940, therefore causing the second member 940 and the attached target product to sink to the sea bottom.

The sensing module 970 can include a plurality of sensors configured to sense, detect, measure, and/or quantify one or more characteristics and/or images relevant to the species of target product 944 disposed on the cultivation apparatus 900. In some embodiments, the sensing module 970 can include one or more sensors configured to sense, detect, and/or measure water temperature, irradiance, dissolved oxygen concentration, concentration of nutrients, concentration of dissolved carbon, salinity, and/or other characteristics related to target product growth.

In some embodiments, the sensing module 970 can include underwater cameras or other imaging technologies configured to image, record, and/or monitor number of plants and/or heterokonts (e.g., kelp, target product, etc.), number of fronds per heterokont, frond dimensions, and/or density associated to target product growth. For example, in some embodiments the sensing module 970 can include a stereoscopic camera system equipped with two or more lenses comprising separate image sensors to simulate human binocular vision and thus facilitate obtaining images with perception of depth.

As shown in FIG. 9, the sensing module 970 can include a rail 972 (also referred to herein as "support structure") configured to provide mechanical support for a camera 974, and/or the communications module 980. The rail 972 can be any suitable shape and/or size. The rail 972 can have sufficient mechanical strength to withstand tidal waves and ocean currents to secure the stability and longevity of the components of the sensing module 970 and the communications module 980. As described above with reference with respect to the cultivation apparatus 700, the rail 972 can be a rigid structure formed from any number of struts (e.g., rod-shaped elements), plates or panels. These struts, plates or panels can include one or more tabs, braces, and/or brackets disposed along their length, which can function as mounting points to couple other components or the rail 972. In that way, the rail 972 can be modular. The rail 972 can define a path suitable to mount the camera 974 or camera(s). In some embodiments, the camera 974 can be motorized. In some embodiments, the camera 974 can be oriented at different depths from the surface of the body of water in which the cultivation apparatus 900 may be deployed. In some embodiments, multiple cameras 974 can be positioned at different depths. In some embodiments, the camera 974 can be movable along the rail 972 to capture images at different depths. In some embodiments, the camera 974 can be controlled by an external device via the communications module 980.

The communications module 980 can be coupled to, or associated with, the sensing module 970. In some embodiments, the communications module 980 can be mechanically coupled to the cultivation apparatus 900 (e.g., to the first member 920) and/or the sensing module 970. In some embodiments, the communications module 980 can be mechanically coupled to the first member 920 of the cultivation apparatus 900. In other embodiments, the communications module 980 can be mechanically coupled to the second member 940 of the cultivation apparatus. In some embodiments, the communications module 980 can coupled to a dedicated flotation device such as a foam, a secondary buoy, and or the like. In some embodiments, the flotation device can also serve as a support structure to other components of the communications module including, but not limited to a satellite antenna, or a power source such as a battery or a solar panel. In some embodiments, the communications module 980 can be electronically coupled (i.e., wired or wireless) to the cultivation apparatus 900 and/or the sensing module 970. In some embodiments, the communications module 980 can be powered by one or more solar panels. For example, in some embodiments, the communications module 980 can be powered by a 20W solar panel configured to provide electric power to the various components of the communication module 980. Alternatively, in some embodiments the communications module 980 can have any suitable power source and/or energy storage device. In some embodiments, the power source of the communications module 980 can include one or more rechargeable batteries. In some embodiments, the communications module 980 can include one or more ports that enable connection between an external power source and the communication module 980 as an auxiliary and/or back up power source. In some embodiments, the communications module 980 can be configured to (1) read the one or more characteristics relevant to the target product, (2) transmit signals representative of the cultivation apparatus 900 and/or the target product characteristics to one or more external devices, and/or (3) receive from one or more external devices signals operable to control the sensing module 970. In some embodiments the apparatus 900 can include one or more tracking devices configured to produce, and/or transmit signals associated with the apparatus 900 relative position upon being seeded with target product and being deployed on oceans, lakes, rivers, and/or any other suitable body of water. The position and/or trajectory of the apparatus 900 can be transmitted, recorded and/or stored (e.g., by the control system, an analysis unit, and/or other compute device) and can be further employed by remote sensing devices to determine and/or quantify (directly or indirectly) target product growth, mass production, and/or carbon capture.

As described above, the cultivation apparatus 900 can be used to seed species of target product that may be utilized in harvesting operations and/or carbon sequestration. In some embodiments, the cultivation apparatus 900 can be first seeded with one or more species of target product, and then deployed on oceans, lakes, rivers, and/or any other suitable body of water. The apparatus 900 can be configured to float near surface to facilitate absorption of UV light, $O_2$ and/or nutrients associated with and/or facilitating target product growth. In some embodiments, the cultivation apparatus 900 can be configured to be accessed for target product harvesting purposes after a predetermined period of time has elapsed, or after a predetermined amount of growth of the selected species of target product has been achieved. In some embodiments, the release component 960 can be configured to degrade after a minimum period of intended lifetime and/or a minimum amount of target product has accumulated on the second member 940, decoupling the first member 920 from the second member 940, causing the first member 920 to float, and the second member 940 and the attached target product to sink to the sea bottom, effectively sequestering the carbon associated with the target product mass.

Figure 10A:
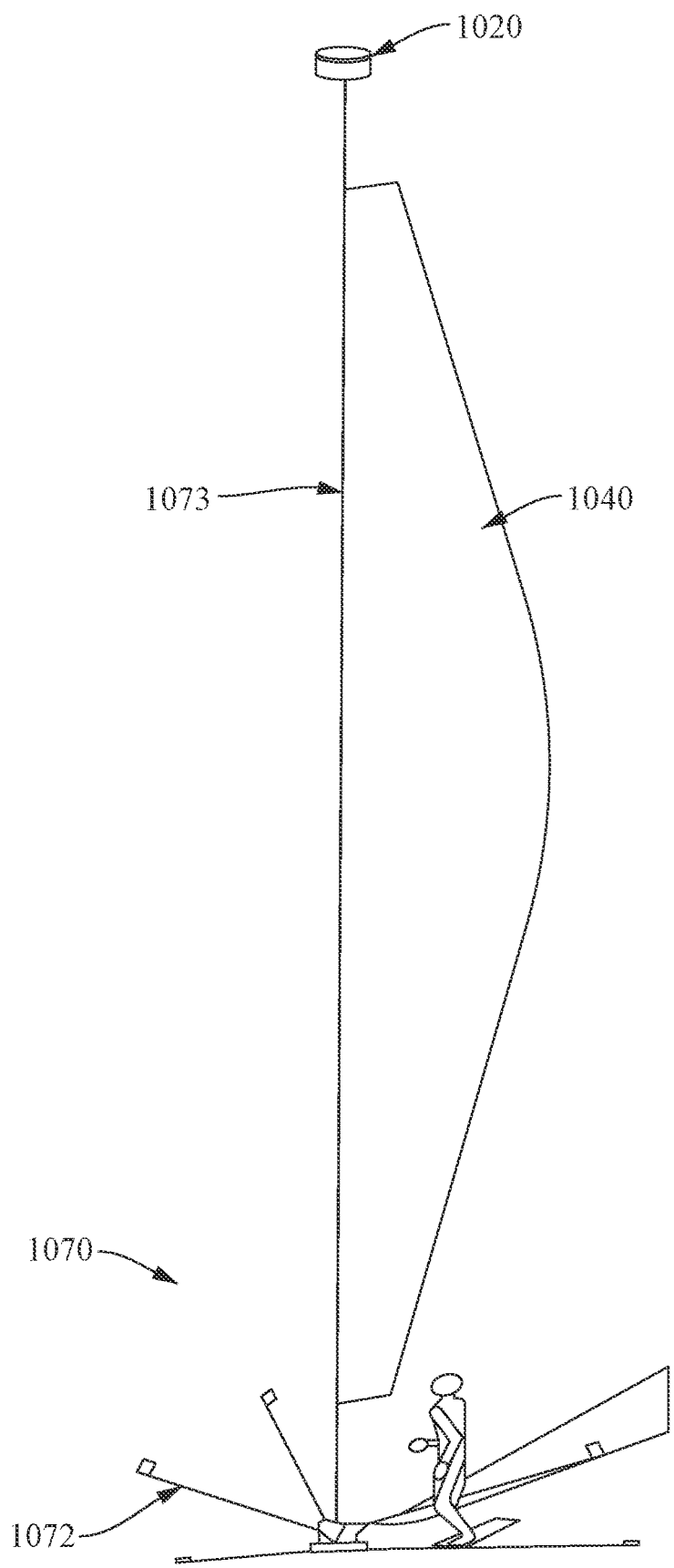
FIGS. 10A and 10B show a front view and a perspective view of sensing module of a target product cultivation apparatus, according to an embodiment.
Figure 10B:
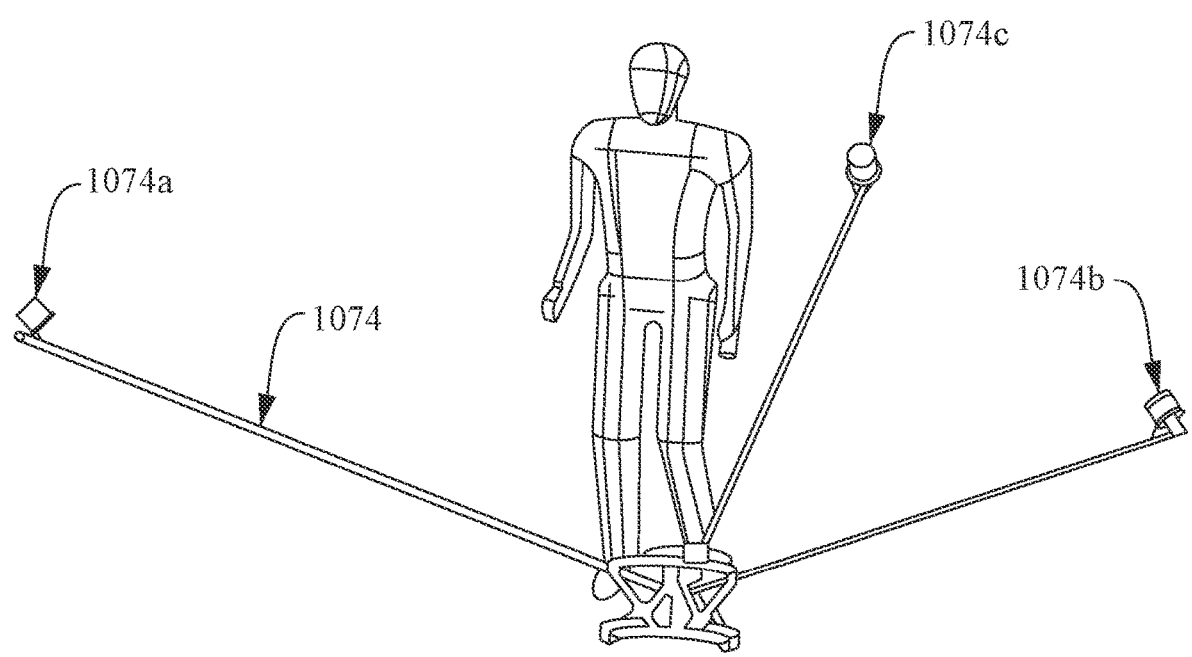

FIGS. 10A and 10B illustrate a sensing module 1070 of a target product cultivation apparatus according to an embodiment. The target product cultivation apparatus (also referred to herein as "cultivation apparatus" or "apparatus") can be similar in form and/or function to the cultivation apparatus 100, 200, 300, 400, 700, 800 and/or 900 described above. For example, as described above with reference to the cultivation apparatus 100, the cultivation apparatus according to this embodiment can be used to seed species of target product that may be utilized in harvesting operations and/or carbon sequestration. In some embodiments, portions and/or aspects of the sensing module 1070 according to this embodiment, can be similar to and/or substantially the same as portions and/or aspects of the sensing module 770 described above with reference to FIG. 7. Accordingly, such similar portions and/or aspects may not be described in further detail herein.

FIGS. 10A-10B shows the sensing module 1070 can includes a frame 1072 configured to provide mechanical support to the one or more cameras 1074a 1074b and 1074c (collectively referred to as cameras 1074). FIG. 10A shows the frame 1072 can be disposed at a distal end of second member 1040 (e.g., a seeding line) to capture images of the target product attached to the seeding line above the cameras. In some embodiments, the frame 1072 can be coupled to the first member 1040 via a chain, a link, a tubular structure, and any other suitable structure. For example, as shown in FIG. 10A, the frame 1072 can be coupled to the first member 1020 via a tubular structure 1073 disposed vertically below the first member 1020 and parallel to or adjacent to the second member 1040. In some embodiments, the frame 1072 can be configured to facilitate orienting the cameras 1074 (e.g., changing the position and angle of the cameras pointing towards the target product) with the purpose of capturing images at different angles of illumination, focal distance, field of view and the like. In some embodiments, the frame 1072 can have multiple arms, each arm being equipped and/or connected to an underwater camera configured to capture images of different sections of the target product disposed on the second member 1040. For example, as shown in FIG. 10A, the frame 1072 can include three arms or beams extending in radial direction from the seeding line, with each arm including a camera 1074 mounted at the end of the arm. In some embodiments, the cameras 1074 can be wired to the communications module 1080 to facilitate transferring images captured by the cameras to an external device. For example, in some embodiments, the cameras can be wired using a tubular structure (not shown) configured to house and or include one or more Ethernet cables that can connect the cameras 1074 to the communications module 1080.

FIGS. 11A-11B illustrate a target product cultivation apparatus 1100 according to another embodiment. The target product, as described herein, includes and/or encompasses a wide variety of species including micro or macro algae, plankton, marine bacteria, archaea filter feeders (such as oysters or clams), or crustaceans either for the purpose of bioremediation, eventual cultivation or for sequestering carbon dioxide. The target product cultivation apparatus 11000 (also referred to herein as "cultivation apparatus" or "apparatus") can be similar in at least form and/or function to the cultivation apparatus 100, 200, 300, 400, 700, 800, and/or 900 described above. For example, as described above with reference to the cultivation apparatus 100, the cultivation apparatus 1100 can be used to seed species of target product that may be utilized in harvesting operations and/or carbon sequestration. The target product cultivation apparatus 1100 includes a first member 1120 configured to accumulate or cultivate a first species of target product 1124, a second member 1140 configured to accumulate or cultivate a second species of target product 1144, and a release component 1160 configured to separate, disconnect, release, and/or decouple the first member 1120 from the second member 1140. In some embodiments, the cultivation apparatus 1100 can be arranged in a modular configuration in which one or more portions of the first member 1120, the second member 1140 and/or the release component 1160 can be mechanically coupled (e.g., by an end user) to collectively form the target product cultivation apparatus 1100. In other embodiments, the target product cultivation apparatus 1100 need not be modular. For example, in some embodiments, the target product cultivation apparatus 1100 can be pre-coupled during manufacturing and/or prior to being delivered to an end user.

The first member 1120 of the cultivation apparatus 1100 can be any suitable shape, size, and/or configuration. For example, as shown in FIGS. 11A and 11B, the first member 1120 can be a ring-like shape. In other embodiments, the first member 1120 can be a disc, a triangular shape, a sphere, cylinder, cone, toroid, cuboid, polyhedral or any other geometrical shape. In some embodiments, one or more portions of the first member 1120 can be formed of a porous and/or hollow material configured to provide buoyancy. In some embodiments, one or more portions of the first member 1120 can be formed of a material relatively permeable to oxygen, carbon dioxide, water, and water-soluble nutrients to enable target product growth. In some embodiments, one or more portions of the first member 1120 can be formed of a relatively transparent material configured to allow absorption visible light.

The cultivation apparatus 1100 can be used to seed species of target product that may be utilized in harvesting operations and/or carbon sequestration. For example, in some embodiments, the first member 1120 of the apparatus 1100 can accumulate or cultivate target product species that become positively buoyant as they mature, and the second member 1140 of the apparatus 1100 can accumulate or cultivate target product species that become negatively buoyant as they mature. In some embodiments, the apparatus 1100 can be first seeded with positively and negatively buoyant target product, and then deployed on oceans, lakes, rivers, and/or any other suitable body of water. The apparatus 1100 can be further configured to be positively buoyant when initially deployed on oceans, lakes, rivers, and/or any other suitable body of water. In some embodiments, the apparatus 1100 can be configured to float for a predetermined period of time after being deployed on oceans, lakes, rivers and/or any other body of water, and then gradually sink as the second member 1140 seeded with negatively buoyant target product grows and obtains mass.

As described herein, the first member 1120 of the cultivation apparatus 900 can be configured to accumulate or cultivate a first species of target product. In some embodiments, one or more portions of the first member 1120 can include a growth substrate configured to provide the nutrients required for target product growth. As shown, for example, in FIGS. 11A and 11B, the first member 1120 can include a surface 1122, a portion of which is arranged and configured to form and/or define the growth substrate. In some embodiments, the first member 1120 growth substrate can include an enriched seawater medium, pasteurized seawater, filtrated seawater, seawater mixed with buffer solutions including but not limited to sodium nitrate (NaNO$_3$) solution, potassium dihydrogen phosphate (KH$_2$PO$_4$) solution, and/or the like. In some embodiments, the first member 1120 growth substrate can include a binder configured to facilitate attachment of the target product to the growth substrate. In some embodiments, the first member 1120 growth substrate can be formed of a fibrous material configured to facilitate attachment of the target product to the first member 1120. In some embodiments, the first member 1120 growth substrate can include additives formulated to suppress contamination of target product. For example, in some embodiments, the first member 920 growth substrate can include germanium dioxide (GeO$_2$).

The second member 1120 of the cultivation apparatus 1100 can be any suitable shape, size, and/or configuration. In some embodiments the shape and of the second member 1140 can be substantially similar to or the same as the shape and of the first member 1120. For example, as shown in FIGS. 11A and 11B, the second member 1140 can be a ring-like shape similar to that of the first member 1120. In other embodiments, the second member 1140 can be a disc, a triangular shape, a sphere, cylinder, cone, toroid, cuboid, polyhedral or any other geometrical shape. In some embodiments, the second member 1140 can be an irregular shape. In some embodiments, one or more portions of the second member 1140 can be formed of a porous and/or hollow material configured to provide buoyancy. In some embodiments, one or more portions of the second member 1140 can be formed of a material relatively permeable to oxygen, carbon dioxide, water, and water-soluble nutrients to enable target product growth. In some embodiments, one or more portions of the second member 1140 can be formed of a relatively transparent material configured to allow absorption visible light. In some embodiments, the second member 1140 can include an optional metallic ring weight (not shown) to provide additional negative buoyancy.

As described herein, the second member 1140 can be configured to accumulate or cultivate a second species of target product. In some embodiments, one or more portions of the second member 1140 can include a growth substrate configured to provide the nutrients required for target product growth. As shown, for example, in FIGS. 11A and 11B, the second member 1140 can include a surface 1142, a portion of which is arranged and configured to form and/or define the growth substrate. In some embodiments the composition of the second member 1140 growth substrate can be substantially similar to or the same as the composition of the first member 1120 growth substrate. Accordingly, the composition of the second member 1140 growth substrate may not be described in further detail herein. In some embodiments, the second member 1140 growth substrate can include a binder configured to facilitate attachment of the to the growth substrate. In some embodiments, the second member 1140 can be formed of a fibrous material configured to facilitate attachment of the target product. In some embodiments, the second member 1140 can include additives formulated to suppress contamination of target product. For example, in some embodiments, the second member 1140 can include germanium dioxide ($GeO_2$). In some embodiments, one or more portions of the second member 1140 can be inoculated with a plurality of diazotroph microorganisms including single-celled archaea organisms, bacteria such as cyanobacteria, azotobacter, rhizobia, Frankia and the like (e.g., microbiota), capable of converting molecular nitrogen ($N_2$) from air into ammonia ($NH_3$) (e.g., fixing nitrogen). In some embodiments, one or more portions of the second member 1140 can be sprayed with a fertilizer formulated to accelerate growth of the species of target product, and to improve the adherence of the species of target product to the second member 1140 by introducing rheology modifiers, agglutinants, and other additives including glycerol, molasses, high molecular weight polysaccharides, and other polymeric materials such as polyethylene oxide.

The release component 1160 of the cultivation apparatus 1100 can be any suitable shape, size, and/or configuration. In some embodiments the shape and size of the release component 1160 can be substantially similar to or the same as the shape and size of the first member 1120 and/or the second member 1140. For example, as shown in FIGS. 11A and 11B, the release component 1160 can be a ring-like shape of smaller size than that of the first member 1120 and the second member 1140. In other embodiments, the release component 1160 can be a disc, a triangular shape, a sphere, cylinder, cone, toroid, cuboid, polyhedral or any other geometrical shape. In some embodiments, the release component 1160 can be an irregular shape. In some embodiments, the release component 1160 can be a band or strip-like shape. In some embodiments, one or more portions of the release component 1160 can be formed of an adhesive, glue, paste, cement and/or the like configured to mechanically couple the first member 1120 to the release component 1160. In some embodiments, one or more portions of the release component 1160 can be formed of an adhesive, glue, paste, cement and/or the like configured to mechanically couple the second member 1140 to the release component 1160. In other words, the release component 1160 can be configured to mechanically couple the first member 1120 to the second member 1140 for at least a period of time.

The release component 1160 (or portions thereof) can be configured to degrade and mechanically decouple the first member 1120 from the second member 1140. One or more portions of the release component 1160 can be formed of any suitable degradable material, similar to and/or substantially the same as the degradable materials of the release component 160 described above with reference to FIG. 1. Accordingly, the materials forming the release component 1160 may not be described in further detail herein. The release component 1160 can be configured to degrade after some minimum period of intended lifetime. For example, in some embodiments, the release component 1160 can be formed of an ocean compatible material designed to decompose and decouple the first member 1120 from the second member 1140 after some minimum intended period of target product growth. In some embodiments, the release component 1160 can be configured to degrade after some minimum amount of mass has accumulated on the first member 1120 and the second member 1140. In some embodiments, the release component 1160 can be configured to degrade under predetermined environmental conditions including but not limited to temperature, pressure, exposure to UV and/or visible light.

FIGS. 12A-12D illustrate the life cycle of a target product cultivation apparatus 1200 according to an embodiment. The target product, as described herein, includes and/or encompasses a wide variety of species including micro or macro algae, plankton, marine bacteria, archaea filter feeders (such as oysters or clams), or crustaceans either for the purpose of bioremediation, eventual cultivation or for sequestering carbon dioxide. The target product cultivation apparatus 1200 (also referred to herein as "cultivation apparatus" or "apparatus") can be similar in at least in form and/or function to the apparatus 100, 200, 300, 400, 700, 800, 900, and 1100 described above. For example, the cultivation apparatus 1200 can accumulate or cultivate species of target product that may be utilized in harvesting operations and/or carbon sequestration. The target product cultivation apparatus 1200 includes a first member 1220 configured to accumulate or cultivate a first species of target product 1224, a second member 1240 configured to accumulate or cultivate a second species of target product 1244, and an release component 1260 configured to separate, disconnect, release and/or decouple the first member 1220 from the second member 1240. As shown in FIG. 12A, the cultivation apparatus 1200 is seeded with positively and negatively buoyant target product, and deployed in a body of water (e.g., oceans, lakes, rivers, and/or any other suitable body of water). As shown, the apparatus 1200 floats on or near the surface of the water line W when initially deployed. Moreover, the cultivation apparatus 1200 can be configured such that after being deployed in the water the first member 1220 faces the water line W, and the second member 1240 faces the bottom of the body of water (i.e., the sea bottom SB).

Referring now to FIG. 12B, after a first time period the second species of target product 1244 begin to grow on the second member 1240 and due to their negative buoyancy, draw the apparatus 1200 down into the water column below the water line W. Similarly, after the first time period the first species of target product 1224 species begin to grow on the first member 1220 and due to their positive buoyancy, grow up from the first member 1220 toward the water line W. In some embodiments, the apparatus 1200 can be configured such that the rate of growth of the second species of target product 1244 exceeds the rate of growth of first species of target product 1224, causing the apparatus 1200 to gradually sink and become submerged in the water as the second species of target product 1244 gains additional mass. In some embodiments, the apparatus 1200 can be configured so that the second species of target product 1244 starts growing during a first portion of the first time period and the first species of target product 1224 starts growing during a second portion of the first time period. In other words, the apparatus 1200 can be configured so that the first species of target product 2124 does not start growing until the apparatus is at least partially submerged below the water line W. In some embodiments, the apparatus 1200 can be configured such that the second species of target product 1244 is initially seeded on the second member 1240 at a higher density than the first species of target product 1224 initially seeded on the first member 1220. This higher seeding density can cause the second species of target product 1244 to grow at a faster rate and/or accumulate more mass faster than the first species of target product 1224, thereby causing the apparatus 1200 to gradually sink and become submerged as the target product 1224, 1244 grows. In some embodiments, the first species of target product 1224 can naturally have a lower positive buoyancy in comparison with the natural negative buoyancy of the second species of target product 1244. In some embodiments, the second species of target product 1244 can be selected to have a faster growth rate than the first species of target product 1224.

Referring now to FIG. 12C, after a second time period the first species of target product 1224 and the second species of target product 1244 have continued to grow and have accumulated more mass. As shown, the apparatus 1200 is at a substantially similar position in the water column relative to the position in FIG. 12B. However, in some embodiments, the apparatus 1200 can be higher or lower in the water column after the second time period depending on any of a number of factors including the relative buoyancy of the first species of target product 1224 and the second species of target product 1244, the relative mass of the target product 1224, 1244, fouling of the apparatus 1200, etc. Also as shown in FIG. 12C, after the second time period the release component 12601060 has begun to degrade to initiate the mechanical decoupling of the first member 1220 from the second member 1240. As described herein, the release component 1260 can be configured to degrade after a predetermined minimum period of intended lifetime. In some embodiments, the release component 1260 can be configured to degrade after a predetermined minimum amount of the first species of target product 1224 has accumulated on the first member 1220, and/or some minimum amount of the second species of target product 1244 has accumulated on the second member 1240. In some embodiments, the release component 1260 can be configured to degrade under predetermined environmental conditions including but not limited to temperature, pressure, exposure to UV and/or visible light, etc.

Referring now to FIG. 12D, after a third time period, the release component 1260 has degraded and the first member 1220 is decoupled from the second member 1240, effectively separating the first species of target product 1224 attached to the first member 1220 from the second species of target product 1244 attached to the second member 1240. In some embodiments, the first member 1220 is configured to float and remain at the water line W after mechanically decoupling from the second member 1240, facilitating harvesting operations of the first species of target product 1224. In embodiments, the second member 1240 is configured to sink to the sea bottom SB after mechanically decoupling from the first member 1220, effectively sequestering the carbon associated with the mass of the second species of target product 1244.

Figure 13:
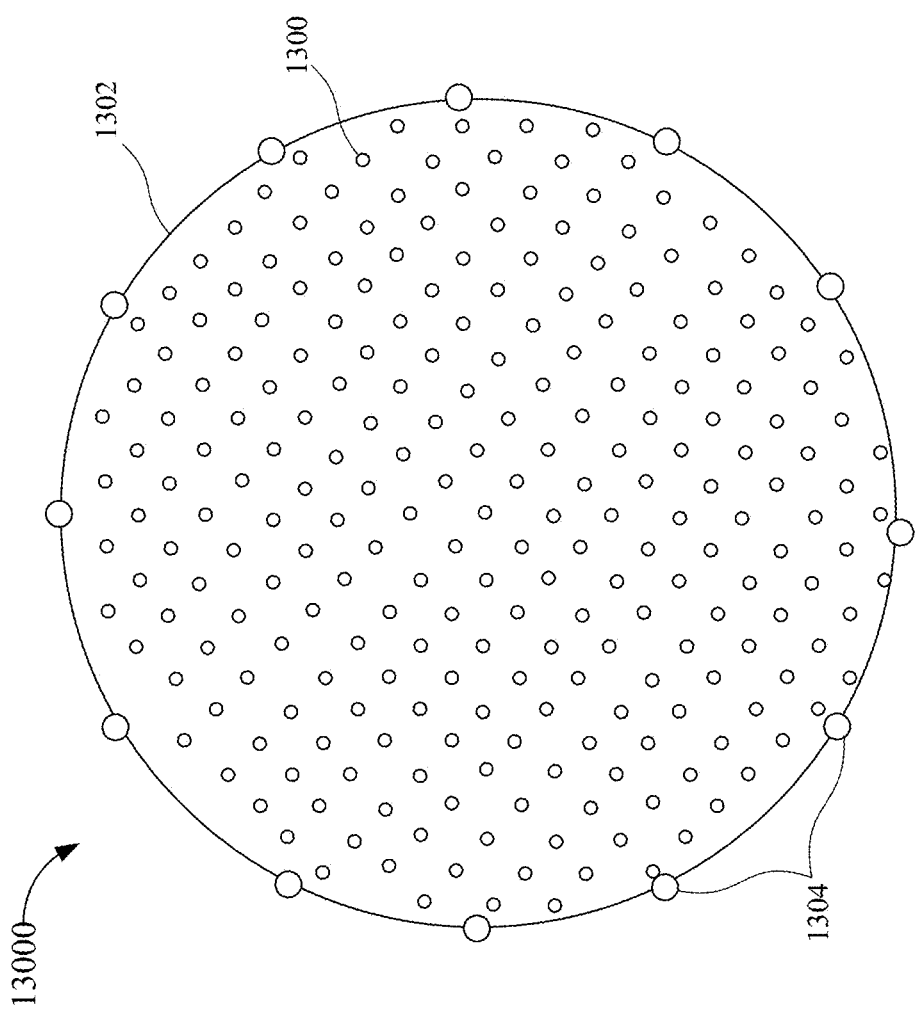
FIG. 13 is a schematic illustration of a target product cultivation system, according to an embodiment.

FIG. 13 illustrates a target product cultivation system 13000, according to an embodiment. The target product, as described herein, includes and/or encompasses a wide variety of species including micro or macro algae, plankton, marine bacteria, archaea filter feeders (such as oysters or clams), or crustaceans either for the purpose of bioremediation, eventual cultivation or for sequestering carbon dioxide. The target product cultivation system 13000 (also referred to herein as "cultivation system") includes a plurality of cultivation apparatuses 1300 that can be similar at least in form and/or function to the apparatus 100, 200, 300, 400, 700, 800, 900, 1100, and/or 1200 described above, thus are not described in further detail herein. For example, as described above with reference to the apparatus 100, 200, 300, 400, 700, 800, 900, 1100, and 1200, the cultivation system 13000 can be used to seed species of target product that may be utilized in large scale harvesting operations and/or carbon sequestration. In addition to the plurality of cultivation apparatuses 1300, the cultivation system 13000 includes a containment boom 1302, and a plurality of buoys 1304.

In some embodiments, the containment boom 1302 can be any suitable shape, size, and/or configuration. For example, in some embodiments, the containment boom 1302 can be a circular shape or any other geometrical shape. In some embodiments, the containment boom 1302 can include multiple flotation segments, a skirt, chain ballasts, tension cables, and/or end connectors. In some embodiments, the containment boom 1302 can be formed of durable and reusable materials. For example, in some embodiments, the containment boom 1302 can include flotation segments formed of durable encapsulated closed-cell polyethylene foam that can be sealed with high strength fabrics. In some embodiments, the containment boom 1302 can include a skirt formed of highly resistant fabrics including PVC and/or nylon configured to provide a barrier enclosing the cultivation apparatuses. In some embodiments, the containment boom 1302 can include galvanized chain ballasts configured to attach to the skirt and provide weight to maintain the skirt in vertical position. In some embodiments, the containment boom 1302 can include stainless steel tension cables configured to carry axial loads imposed on the containment boom 1302 by external forces including currents, winds, and/or towing. In some embodiments, the containment boom 1302 can include high tensile strength aluminum end connectors.

In some embodiments, the buoys 1304 can be any suitable shape, size, and/or configuration. For example, in some embodiments, the buoys 1304 can be a disk shape, toroid, cone, sphere, skiff, spar or any other shape. In some embodiments, the buoys 1304 can be configured to be anchored or free-floating. In some embodiments, the buoys 1304 can be made of, or include, any of a number of materials including, for example, wood, steel, aluminum, and/or synthetic materials including, fiber glass, high density polyethylene, polystyrene, and polyurethane elastomers, and/or any other suitable material such as any of those described herein. In some embodiments, the buoys 1304 can be configured to be reusable. In some embodiments, the buoys 1304 can be configured to be capable of tracking and performing automated processes needed for target product growth, harvesting operations, and/or carbon sequestration. In some embodiments, the buoys 1304 can be placed within the containment boom 1304 to provide information related to the weight of target product mass accumulated on the cultivation system 13000.

FIG. 14 depicts an example method of using the systems and cultivation apparatus described herein. The method 1400 includes seeding an apparatus with one or more species of target product at 1401. As the one or more species of target product are disposed on the apparatus, the method 1400 includes, at 1402, deploying the apparatus in a body of water. In some embodiments, the apparatus can be deployed on oceans, lakes, rivers, and/or any other suitable body of water. The method 14000 includes at 1403, allowing the one or more species of target product to grow and accumulate mass. In some instances, the growth and accumulation of mass can be recorded and/or monitored using underwater cameras and/or other imaging technologies that can image the target product over time for analysis of the number of plants and/or heterokonts (e.g., kelp, target product, etc.), number of fronds per heterokont, frond dimensions, and/or density associated to target product growth.

The method 1400 further includes at 1404 determining an amount of carbon captured by the accumulation of the mass. In some embodiments, the method can include transmitting images recorded by the underwater camera via a communications module to an external device. In some instances, the transmitted images can be analyzed to determine target product growth and associated amount of carbon captured by the apparatus. In some implementations, the method can include analyzing the images recorded by the underwater cameras manually. In other instances, method can include analyzing the images using machine vison algorithms. In other instances, mass accumulation, mass yield, target product growth, and carbon sequestration capacity per unit mass of target product, associated with a seeded apparatus can be estimated by retrieving the apparatus after a predetermined amount of time being deployed in a body of water to measure the wet weight (i.e., the weight of target product as it is retrieved from the apparatus), the dry weight (i.e., the weight of target product after drying under predetermined conditions), and overall dimensions of the target product grown. At 1405, the method 1400 includes allowing the microalgae to sink to the sea floor. In some embodiments, the apparatus can include a first member configured to sink to the sea bottom after a minimum period of intended lifetime and/or a minimum amount of target product has accumulated on the apparatus. The method 1400 optionally includes at 1406 Selling a carbon credit associated to the amount of carbon sequestered.

While various embodiments have been particularly shown and described, it should be understood that they have been presented by way of example only, and not limitation. Various changes in form and/or detail may be made without departing from the spirit of the disclosure and/or without altering the function and/or advantages thereof unless expressly stated otherwise. Where schematics and/or embodiments described above indicate certain components arranged in certain orientations or positions, the arrangement of components may be modified.

Although various embodiments have been described as having particular features and/or combinations of components, other embodiments are possible having a combination of any features and/or components from any of embodiments described herein, except mutually exclusive combinations. The embodiments described herein can include various combinations and/or sub-combinations of the functions, components, and/or features of the different embodiments described.

The specific configurations of the various components can also be varied. For example, the size and specific shape of the various components can be different from the embodiments shown, while still providing the functions as described herein. More specifically, the size and shape of the various components can be specifically selected for a desired or intended usage. Thus, it should be understood that the size, shape, and/or arrangement of the embodiments and/or components thereof can be adapted for a given use unless the context explicitly states otherwise.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

The invention claimed is:

1. A method, comprising:
seeding an apparatus with macroalgae, the apparatus having a release component including a first portion made of a material that degrades at a first degradation rate and a second portion made of a material that degrades at a second degradation rate faster than the first degradation rate, the material of the second portion including an alkali metal;
allowing the macroalgae to grow and accumulate biomass;
after the macroalgae accumulates at least a predetermined amount of biomass and as a result of the degradation of at least the second portion of the release component, allowing the macroalgae to sink to a floor of a body of water; and
determining an amount of carbon sequestered by the sinking of the macroalgae.

2. The method of claim 1, further comprising:
deploying the apparatus in the body of water, the body of water being an ocean.

3. The method of claim 2, wherein the macroalgae is allowed to sink below a predetermined depth.

4. The method of claim 3, wherein the predetermined depth is sufficient for permanent sequestration of carbon.

5. The method of claim 3, wherein the predetermined depth is at least about 1,000 meters.

6. The method of claim 1, further comprising:
imaging the macroalgae to determine the amount of carbon sequestered by the sinking of the macroalgae.

7. The method of claim 1, further comprising:
selling a carbon credit associated with the amount of carbon sequestered by the macroalgae.

8. The apparatus of claim 1, wherein the second degradation rate is based at least in part on a time sufficient to allow the macroalgae to accumulate at least the predetermined amount of biomass.

9. A method, comprising:
seeding an apparatus with macroalgae, the apparatus including a first member, a second member, and a release component, the first member providing buoyancy to the apparatus and the second member configured to receive the macroalgae, the release component including a first portion made of a material that degrades at a first degradation rate and a second portion made of a material that degrades at a second degradation rate faster than the first degradation rate, the material of the second portion including an alkali metal;

allowing the macroalgae to grow and accumulate biomass; and after the macroalgae accumulates at least a predetermined amount of biomass, allowing the macroalgae to sink to a floor of a body of water.

10. The method of claim 9, wherein the second member sinks to the floor of the body of water with the macroalgae.

11. The method of claim 9, wherein the first member and the second member sink to the floor of the body of water with the macroalgae.

12. The method of claim 9, wherein the second member sinks to the floor of the body of water with the macroalgae and the first member maintains buoyancy and remains at a surface of the body of water.

13. The method of claim 9, wherein the macroalgae is allowed to sink below a predetermined depth.

14. The method of claim 13, wherein the predetermined depth is at least about 1,000 meters.

15. The method of claim 14, further comprising:
determining an amount of carbon sequestered by the sinking of the macroalgae.

16. The method of claim 15, further comprising:
selling a carbon credit associated with the amount of carbon sequestered by the macroalgae.

17. The method of claim 9, further comprising:
imaging the macroalgae to determine an amount of carbon associated with the biomass.

18. The apparatus of claim 9, wherein the release component is coupled to the first member, the degradation of the release component allowing the first member to lose buoyancy.

19. The apparatus of claim 9, wherein the second degradation rate is based at least in part on a time sufficient to allow the macroalgae to accumulate at least the predetermined amount of biomass.

20. An apparatus for cultivating or accumulating macroalgae, comprising:
a first member configured to provide buoyancy to the apparatus;
a second member coupled to the first member, the second member seeded with the macroalgae; and
a release component coupled to the first member, the release component including a first portion made of a material that degrades at a first degradation rate and a second portion made of a material that degrades at a second degradation rate faster than the first degradation rate, the material of the second portion including an alkali metal,
wherein the first member is configured to lose buoyancy after a predetermined time as a result of the degradation of the release component, thereby allowing the macroalgae to sink to a floor of a body of water.

21. The apparatus of claim 20, wherein the first member is substantially hollow.

22. The apparatus of claim 20, wherein the first member is a buoy.

23. The apparatus of claim 20, wherein the second portion of the release component is configured to degrade after the predetermined time.

24. The apparatus of claim 20, wherein the predetermined time is a time sufficient to allow the macroalgae to accumulate at least a predetermined amount of biomass, the second degradation rate being based at least in part on the predetermined time.

25. An apparatus for cultivating or accumulating macroalgae, comprising:
a first member configured to provide buoyancy to the apparatus;
a second member coupled to the first member, the second member seeded with the macroalgae; and
a release component configured to degrade after a predetermined time, thereby allowing the macroalgae to sink to a floor of a body of water, the release component including a first portion made of a material that degrades at a first degradation rate and a second portion made of a material that degrades at a second degradation rate faster than the first degradation rate, the material of the second portion including an alkali metal.

26. The apparatus of claim 25, wherein the release component couples the first member to the second member, the degradation of the release component decoupling the first member from the second member.

27. The apparatus of claim 25, wherein the release component is coupled to the first member, the degradation of the release component allowing the first member to lose buoyancy.

28. The apparatus of claim 25, wherein each of the first portion and the second portion of the release component degrades at a predictable rate.

29. The apparatus of claim 28, wherein the material of the first portion of the release component includes Zinc.

30. The apparatus of claim 25, wherein the predetermined time is a time sufficient to allow the macroalgae to accumulate at least a predetermined amount of biomass, the second degradation rate being based at least in part on the predetermined time.

* * * * *